United States Patent [19]

Tajima et al.

[11] Patent Number: 5,572,600
[45] Date of Patent: Nov. 5, 1996

[54] COLOR IMAGE PROCESSING APPARATUS CAPABLE OF SUPPRESSING MOIRE

[75] Inventors: Joji Tajima; Mitsuo Kaji; Miki Ito; Akira Ito, all of Tokyo; Youichi Sato, Kanagawa, all of Japan

[73] Assignee: NEC Corporation, Tokyo, Japan

[21] Appl. No.: 263,687

[22] Filed: Jun. 22, 1994

[30] Foreign Application Priority Data

Jun. 22, 1993 [JP] Japan ................................. 5-150159
Jun. 14, 1994 [JP] Japan ................................. 6-131533

[51] Int. Cl.$^6$ ........................................... H04N 1/40
[52] U.S. Cl. ........................... 382/163; 358/454; 358/533
[58] Field of Search .................................... 382/162, 163, 382/275; 358/454, 533; H04N 1/40, 1/46

[56] References Cited

U.S. PATENT DOCUMENTS

| | | | |
|---|---|---|---|
| 4,350,996 | 9/1982 | Rosenfeld | 358/75 |
| 4,903,123 | 2/1990 | Kawamura et al. | 358/533 |
| 4,924,301 | 5/1990 | Surbrook | 358/454 |
| 4,980,757 | 12/1990 | Nishigaki | 358/533 |
| 5,040,080 | 8/1991 | Scholten | 358/454 |
| 5,055,923 | 10/1991 | Kitagawa et al. | 358/454 |

FOREIGN PATENT DOCUMENTS

| | | |
|---|---|---|
| 520774A2 | 12/1992 | European Pat. Off. . |
| 2397112 | 7/1978 | Germany . |
| 2827596 | 2/1980 | Germany . |
| 2098022 | 11/1982 | United Kingdom . |
| 2157119 | 10/1985 | United Kingdom . |

OTHER PUBLICATIONS

"PostScript Screening" by Peter Frink, published by Adobe Systems Incorporated, 1992, pp. 42–98.
European Search Report.

*Primary Examiner*—Leo Boudreau
*Assistant Examiner*—Chris Kelley
*Attorney, Agent, or Firm*—Sughrue, Mion, Zinn, Macpeak & Seas

[57] ABSTRACT

An image data generating circuit of a color image processing apparatus generates multivalued image data for each color in accordance with density of each color of magenta (M), cyan (C) and yellow (Y). An M-screen threshold value generating circuit outputs a plurality of first threshold values, a C-screen threshold value generating circuit outputs a plurality of second threshold values, and a Y-screen threshold value generating circuit for outputting a plurality of third threshold values. A comparing circuit compares the multivalued image data outputted from the image data generating circuit with the first to third threshold values outputted from the M-, C- and Y- screen generating circuits for each color to output a comparison result in the form of a binary signal. The first and second threshold values is assigned to each pixel of an M multi-cell and a C multi-cell constituted by square matrixes having screen angles of $\pm\tan^{-1}(q/p)$ and each side of $\beta \cdot p \cdot q$, respectively. For preventing coarse moire, p and q are any value of (11,3), (15,4) and (19,5), and the M multi-cell and the C multi-cell consist of N ($=p^2+q^2$) sub-cells arrayed continuously in the directions of the screen angles of $\pm\tan^{-1}(q/p)$ and having threshold values in accordance with the predetermined number of gradations. The third threshold value is assigned to a Y multi-cell constituted by a square matrix having a screen angle of 45 degrees and each side of $\beta \cdot p \cdot q$. The Y multi-cell consists of $2(p-q)^2$ sub-cells arrayed continuously in the direction of the screen angle of 45 degrees. The first to fourth threshold values are repeatedly outputted in a cycle of $\beta \cdot p \cdot q$ in synchronism with the multivalued image data of each color.

2 Claims, 17 Drawing Sheets

TAN θ = 3/11

TAN θ = 4/15

TAN θ = 5/17

FIG. 18
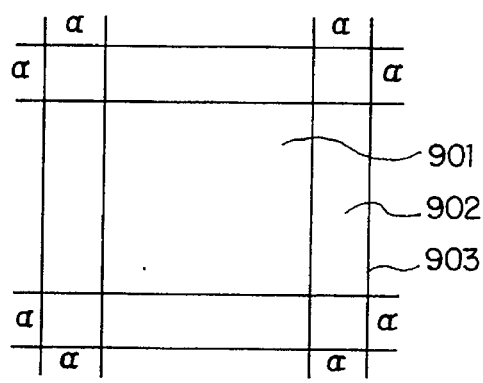
FIG. 19
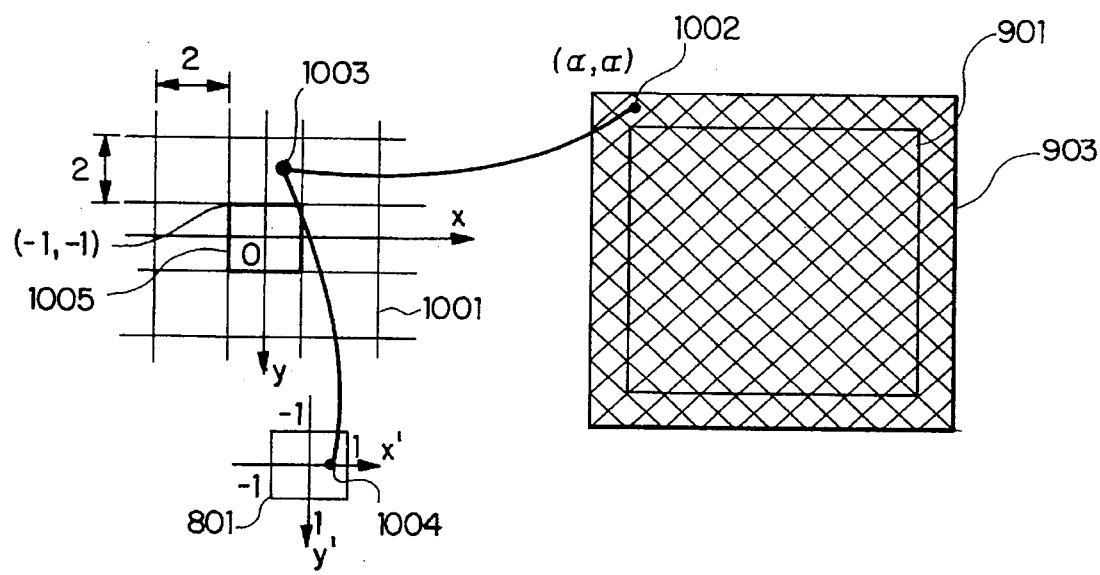
FIG. 20
| X-COUNT | Y-COUNT | ~1101

COLOR IMAGE PROCESSING APPARATUS CAPABLE OF SUPPRESSING MOIRE

BACKGROUND OF THE INVENTION

1. Field of the Invention

The present invention relates to a color image processing apparatus for use in a color scanner, a printer, a facsimile machine or the like, and more particularly to a color image processing apparatus using a threshold value of a digital halftone screen which prevents the occurrence of moire and generates a regular rosette pattern when a plurality of dot images having different screen angles in accordance with colors are superimposed on each other.

2. Description of the Related Art

Hitherto, a color image processing apparatus for generating a dot image uses a halftone screen set having screen angles of ±15 and 45 degrees to produce image signals of three color; a C (cyan), an M (magenta) and a Y (yellow) by dot-processing.

According to the "PostScript Screening" by Peter Frink published by "Adobe Systems Incorporated" in 1992, that three plates having identical dot intervals are superimposed on each other at the interval of 30 degrees satisfies the condition under which the finest moire occurs. When the dot processing is digitally made, a screen angle is set to +15 degrees relative to magenta, −15 degrees relative to cyan and 45 degrees relative to yellow, respectively. In order to generate image signals of dot images having these screen angles, a unit area equal to an area which can be occupied by one dot is determined, and threshold values corresponding to a plurality of pixels equal to or more than the number of gradations in the unit area are set. Such threshold values constitute threshold values in a digital halftone screen. Finally, the threshold values in the digital halftone screen are compared with color image signals obtained by scanning color original images, thereby to output its result in the form of digital values, that is, 1 and 0. When recording, a pixel corresponding to the digital value of 1 is recorded in the unit area thereby to record the dot image.

The digital halftone screen has a structure in which dot cells 301 constituting a minimum unit of the threshold value are cyclically arranged as shown in FIG. 1, and represented by a periodic function of the following formula (1).

$$h(x-p, y-q)=h(x, y)$$
$$h(x-q, y+p)=h(x, y) \quad (1)$$

Cyclic constants (p, q) in the formula (1) determines the screen angle and the number of gradations of the halftone screen. That is, the screen angle $\theta$ is determined in accordance with formula (2) whereas the number N of gradations is determined in accordance with formula (3)

$$\theta=\tan^{-1}(q/p) \quad (2)$$

$$N=p^2+q^2+1 \quad (3)$$

x, y, p and q in formula (1) to (3) must be integers, however, when the screen angle $\theta$ has accurately ±15 degrees, all of x, y, p and q are not the integers.

For example, the halftone screen having fifty gradations at the screen angle of 15 degrees cannot be constituted because of a limitation that both of formulas (2) and (3) are satisfied and also the cyclic constants (p, q) are integers. In this case, a pair of cyclic constants extremely capable of approximating to ideal values is unavoidably selected. For example, if p=7 and q=2 are approximate values thereof, the halftone screen having the screen angle of 15.9 degrees and the number of gradations of 54 can be obtained.

However, in the conventional halftone screen, screen ruling representing the number of dot boundary lines (the number of dots) per inch, are different from each other between a screen having the screen angle approximating to ±15 degrees and a screen having the screen angle approximating to 45 degrees.

Therefore, in the case where the screens of C, M, and Y are superimposed on each other for recording, there arises a defect to occur moire which cannot be forecasted.

SUMMARY OF THE INVENTION

An object of the present invention is to provide a color image processing apparatus capable of generating moire close to an ideal pattern without generation of coarse moire.

Another object of the present invention is to provide a color image processing apparatus capable of cyclically generating threshold values of screens for comparison with multivalued image data to make the screen sizes identical with each other.

Still another object of the present invention is to provide a color image processing apparatus capable of arbitrarily altering the threshold values of the screens for comparison with the multivalued image data.

To achieve the above-mentioned objects, the present invention provides a color image processing apparatus, comprising: an image data generating circuit for generating multivalued image data for each color in accordance with density of each color of magenta (M), cyan (C) and yellow (Y); ; an M-screen threshold value generating circuit for outputting a plurality of first threshold values for comparison with the multivalued image data of magenta (M); a C-screen threshold value generating circuit for outputting a plurality of second threshold values for comparison with the multivalued image date of cyan (C); a Y-screen threshold value generating circuit for outputting a plurality of third threshold values for comparison with the multivalued image data of yellow (Y); a comparing circuit for comparing the multivalued image data outputted from the image data generating circuit with the first to third threshold values for each color outputted from the respective screen generating circuits to output a comparison result in the form of a binary signal; and a control circuit for controlling the first to third threshold values outputted from the respective screen threshold value generating circuits.

The first and second threshold values outputted from the M-screen threshold value generating circuit and the C-screen threshold value generating circuit are threshold values assigned to each pixel of an M multi-cell and a C multi-cell. The M and C multi-cells are respectively constituted by a square matrix having screen angles of $\pm\tan^{-1}(q/p)$ and each side of $\beta\cdot p\cdot q$, respectively. For the purpose of preventing coarse moire, p and q are any value of (11,3), (15,4) and (19,5), and the M multi-cell and the C multi-cell consist of N ($=p^2+q^2$) sub-cells arrayed continuously in directions of the screen angles of $\pm\tan^{-1}(q/p)$ and having threshold values in accordance with the predetermined number of gradations, respectively.

The third threshold value outputted from the Y screen threshold value generating circuit is a threshold value assigned to a Y multi-cell constituted by a square matrix having the screen angle of 45 degrees and each side of $\beta\cdot p\cdot q$.

The Y multi-cell consists of $2(p-q)^2$ sub-cells arrayed continuously in a direction of the screen angle of 45 degrees and having threshold values in accordance with the predetermined number of gradations.

The first to third threshold values are repeatedly outputted in a cycle of β·p·q in synchronism with multivalued image data of each color in accordance with control of the control circuit.

The respective screen threshold value generating circuits may be constituted by a simple screen memory, or the threshold values outputted by the threshold value generating circuits may be written in the screen memory under control of the control circuit, automatically. The latter threshold value generating circuits are constructed as follows.

Each of the threshold value generating circuits which automatically generate the threshold values includes a coordinate data generating circuit for generating coordinate data X and Y of coordinates (X, Y) within a square region where a surplus region is added to image regions of the M multi-cell, the C multi-cell and the Y multi-cell; a first coordinate transformation circuit for transforming the coordinate data X and Y into coordinate data x and y of coordinates (x, y) on a virtual orthogonal screen plane in accordance with the Affine transformation to output the coordinate data x and y; and a second coordinate transformation circuit for transforming the coordinate data x and y into coordinate data x' and y' within a square region of $-j \leq x \leq j$ and $-j \leq y \leq j$ to generate flags which discriminate the regions of the sub-cells of the M multi-cell, cell, the C multi-cell and the Y multi-cell in association with the coordinate data x' and y'. Each of the threshold value transformation circuits of the threshold value generating circuits transforms the coordinate data x' and y' outputted from the second coordinate transformation circuit into a threshold value t on the basis of the following transformation formula to output the threshold value t:

$$t = k \cdot (|x'| + |y'|)/2 \qquad (k: \text{an integer})$$

The threshold value t outputted from the threshold value generating circuit is stored in a memory circuit in association with the flag. A threshold value replacing circuit selects the threshold value t within the region associated with the flag from the memory circuit to replace the threshold value t with another threshold value thereby to make halftone expression smooth.

The threshold value which has been replaced by the threshold value replacing circuit is stored in each of the screen memories under control of the control circuit.

BRIEF DESCRIPTION OF THE DRAWINGS

The accompanying drawings, which are incorporated in and constitute a part of this specification, illustrate embodiments of the invention, and together with the description, serve to explain the objects, advantages and principles of the invention. In the drawings.

FIG. 18 is a diagram showing a method of adding a surplus region to a multi-cell;

FIG. 19 is a diagram showing a procedure of transforming coordinates;

FIG. 20 is a diagram showing flag values;

DETAILED DESCRIPTION OF THE PREFERRED EMBODIMENTS

Figure 2:
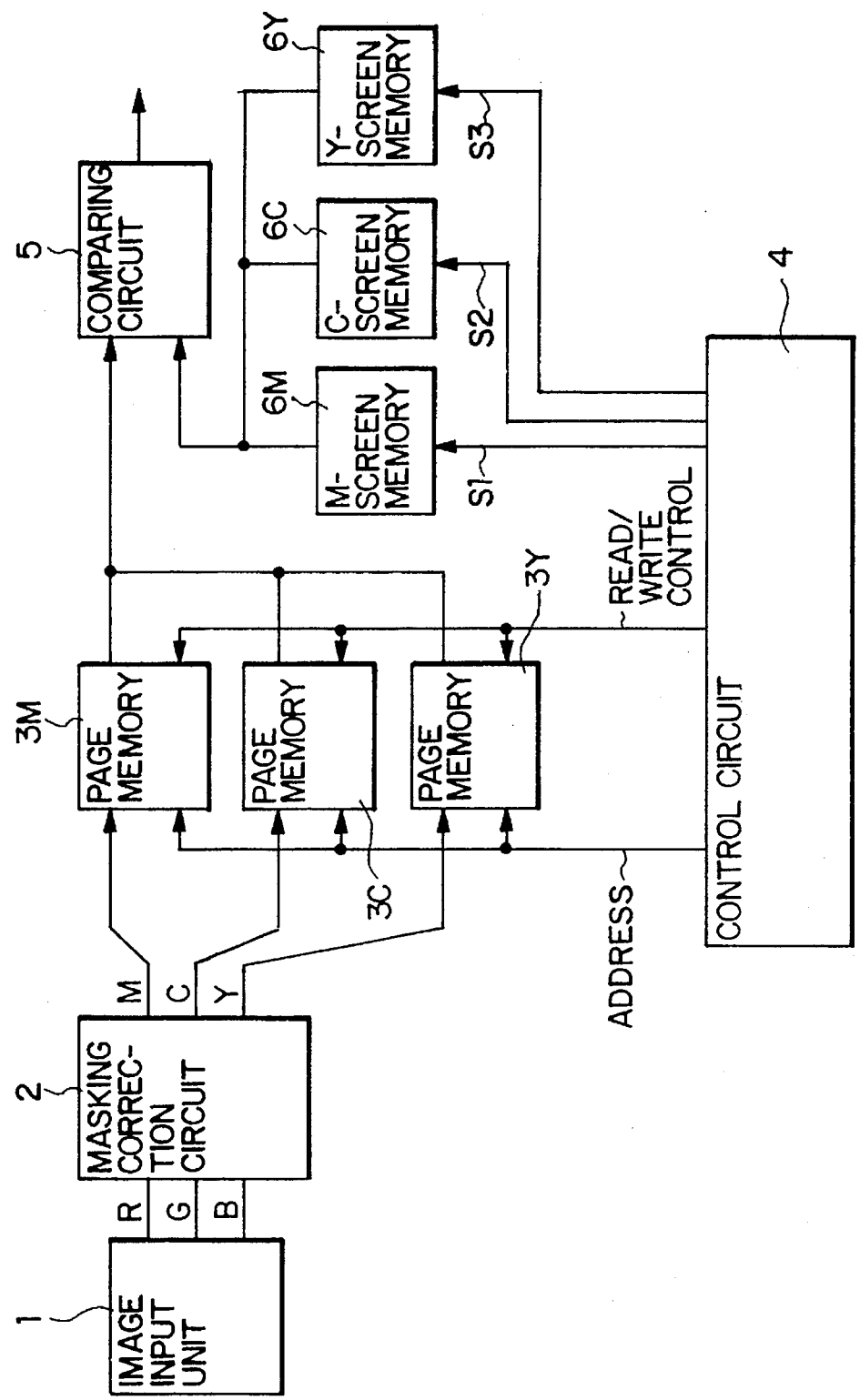
FIG. 2 is a block diagram showing a color image processing apparatus in accordance with a first embodiment of the present invention.

FIG. 2 is a block diagram showing a color image processing apparatus in accordance with an embodiment of the present invention. In the figure, an image input unit 1, which includes an image sensor, color separation filters and an A/D converter, scans an original image thereby to generate multivalued color data. The original image is separated by the filters of red (R), green (G) and blue (B), and optical signals thus separated are converted into electric signals every scanning line by the image sensor. The A/D converter subjects the electric signal outputted from the image sensor to analog-to-digital conversion, thereby to output multivalued color data of R, G and B. A masking correction circuit 2 converts the multivalued color data of R, G and B outputted from the image input circuit 1 into data of magenta (M), cyan (C), and yellow (Y) through color correcting operation, and further removes under-color through the function of "under control removal" (UCR) thereby to output multivalued image data. The multivalued image data of M, C and Y are temporarily stored by eight bits and 256 gradations in page memories 3M, 3C and 3Y, respectively.

The page memories 3M, 3C and 3Y store the respective multivalued image data of M, C and Y by the quantity of one page in accordance with a write control signal and an address signal outputted from a control circuit 4. The respective multivalued image data of M, C and Y are read in order from the page memory 3M to 3Y in accordance with the read control signal and the address signal from the control circuit 4, thereby to be outputted to a comparing circuit 5. The comparing circuit 5 successively Compares the multivalued image data outputted from the page memories 3M, 3C and 3Y with threshold values outputted from an M-screen memory 6M, a C-screen memory 6C and a Y screen memory 6Y for each color, thereby to output their results in the form of a binary signal of 0 and 1. Read of the respective screen memories 6M, 6C and 6Y is changed over every page in accordance with selection signals s1, s2 and s3 outputted from the control circuit 4.

Figure 3:
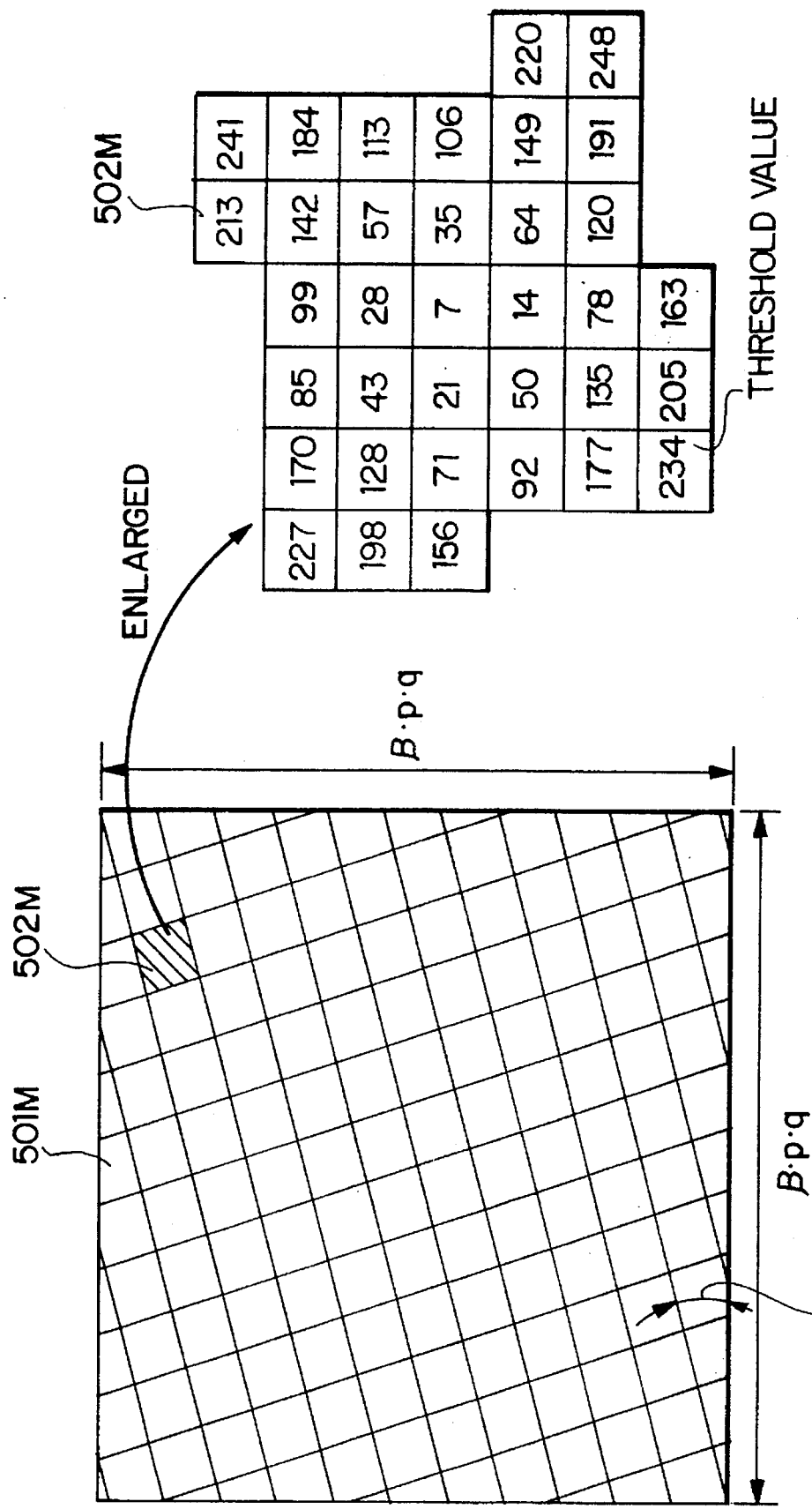
FIG. 3 is a block diagram showing a part of threshold value matrixes of an M multi-cell and its sub-cells of a magenta halftone screen.
Figure 4:
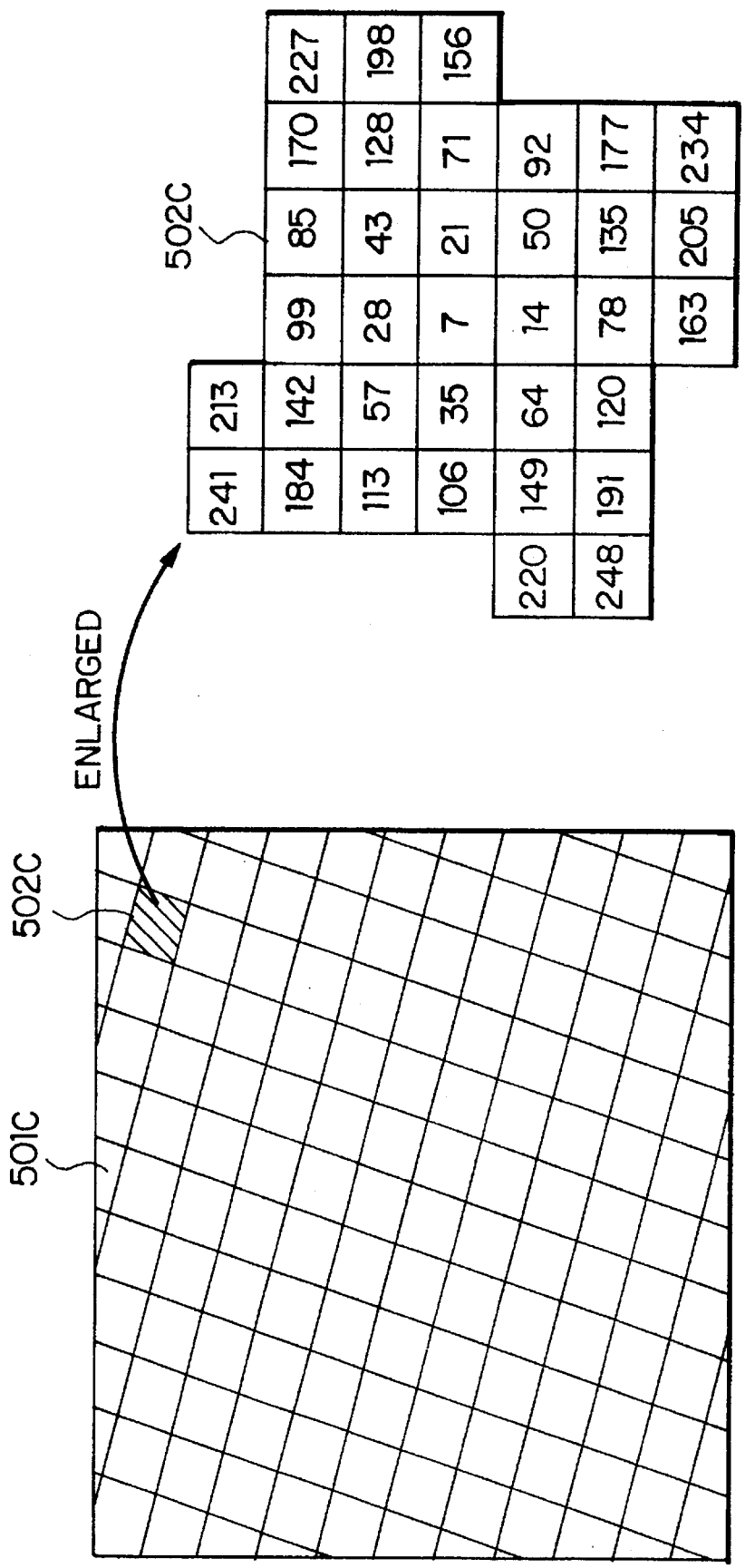
FIG. 4 is a block diagram showing a part of threshold value matrixes of a C multi-cell and its sub-cells of a cyan halftone screen.
Figure 5:
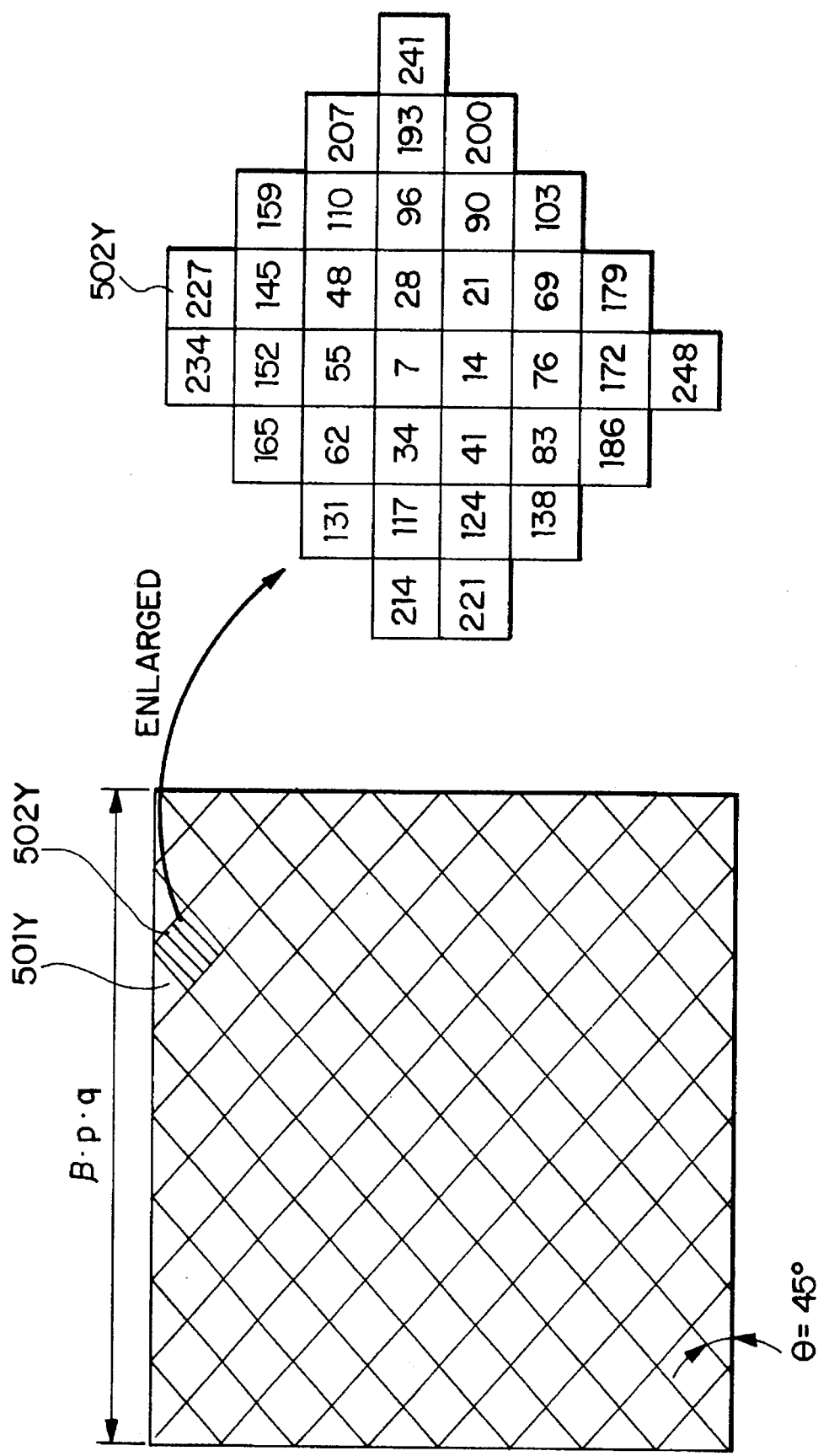
FIG. 5 is a yellow diagram showing a part of threshold value matrixes of a Y multi-cell and its sub-cells of a black halftone screen.

The M-screen memory 6M stores a first threshold value of a magenta halftone screen having the screen angle θ of approximately +15 degrees. The C-screen memory 6C stores a second threshold value of a cyan halftone screen having the screen angle θ of approximately −15 degrees. The Y-screen memory 6Y stores a fourth threshold value of a Yellow halftone screen having the screen angle θ of 45 degrees. As shown in FIGS. 3 to 5, the respective screen memories 6M, 6C and 6Y store threshold values of multi-cells 501M, 501C and 501Y where a plurality of sub-cells 502M, 502C and 502Y are cyclically arranged. Each of the sub-cells is a dot cell for forming one dot.

The respective sub-cells are arrayed in a direction of the screen angle $\theta=\tan^{-1}(q/p)$ when a pair (p,q) of p and q is any value of (11,3), (15,4), (19,5) in order to form the multi-cell having a screen angle and a screen ruling with reduced moire, which will be described later. A Size of the multi-cell and an area of the sub-cell are predetermined values as will be described later.

The control circuit 4 repeatedly reads the threshold value data of the multi-cells 501M, 501C and 501Y stored in the screen memories 6M, 6C and 6Y from an x-axial direction (main scanning direction) toward a y-axial direction (sub-scanning direction) in FIGS. 3 to 5. Therefore, the comparing circuit 5 cyclically compares the threshold values from the screen memories 6M, 6C and 6Y with the multivalued image data from the page memories 3M, 3C and 3Y to generate output data of a dot pattern formed of data of 1 and 0. For example, in FIG. 3, if the size of the multi-cell 501M is represented by M1 pixels in the x-axial direction and M1 line in the y-axial direction, the multivalued image data of the original image is repeatedly compared with the threshold value of the multi-cell 501M in every square pixel region of M1×M1 (length of the main scanning direction by length of the sub-scanning direction).

The screen angle θ of the M multi-cell 501M and the C multi-cell 501C is ideally ±15, however, since a tangent value tan (±15) cannot be represented by q/p, the value of q/p close to the value of tan (±15) is used instead.

In this embodiment, it is expected that the shape of moire equals to one which occurs under an ideal condition where three screens having the screen angles θ of ±15 degrees and 45 degrees with accuracy and the screen rulings equal to each other are superimposed on each other. The screen angle having the tangent value at which moire having a shape closest to the expected moire occurs is determined. The multi-cell is formed at the screen angle, and the threshold value is given for each of the sub-cells constituting the multi-cell.

First, the expectation of the shape of moire under the ideal condition and the determination of the screen angle will be described. The arrangement of dots disposed in an image region and spectra in a spatial frequency region establishes a relationship shown in FIG. 6. That is, the following relationship is established.

a) An inverse number of a cycle (i, j) of an image region P comes to a spectrum position (p, q) in a spatial frequency region F.

b) An inverse number of a dot interval w in the image region P comes to a spectrum interval 1/w of the spatial frequency region F.

c) In the image region P, the cycle (i, j) and the dot interval w satisfy a relationship of formula (4).

$$w=(i \cdot j)/(i^2+j^2)^{1/2} \qquad (4)$$

d) The screen angle θ of the image region P is represented by $\tan^{-1}(q/p)$ in the spatial frequency region F, which also comes to the same value of e as that of the screen angle.

If the respective spectra of the spatial frequency region F are represented by f (θ) mn [m, n: 0, ±1, ±2, ±3, . . . ], the coordinates (μ, ν) of f(θ) mn [μ: a spatial frequency in the x-direction, ν: a spatial frequency in the y-direction] is represented by formula (5).

$$\mu=(1/w)(m \cdot \cos\theta - n \cdot \sin\theta)$$

$$\nu=(1/w)(m \cdot \sin\theta - n \cdot \cos\theta) \qquad (5)$$

If two kinds of screens having an inclination of arrangement of the spectrum being ±θ (tan θ=q/p) are superimposed on every spectrum in the spatial frequency region F, that is, if the convolutions of two kinds of screens are calculated, a spectrum f (θ=45) mn is produced at a position of formula (6) (m+n=an even number).

$$\mu_m=\pm m \, (1/w) \, (m \cdot \cos\theta - n \cdot \sin\theta)$$

$$\nu_n=\pm n \, (1/w) \, (m \cdot \sin\theta - n \cdot \cos\theta) \qquad (6)$$

Consequently, in order to prevent coarse moire from occurring when three-color screens of M, C and Y are superimposed on each other, it is necessary to use an orthogonal screen having the screen angle of 45 degrees and a spectrum at the coordinate point $(\mu_m, \nu_n)$ represented by the formula (6) in combination with two orthogonal screens having the screen angle of ±15 degrees.

Figure 6:
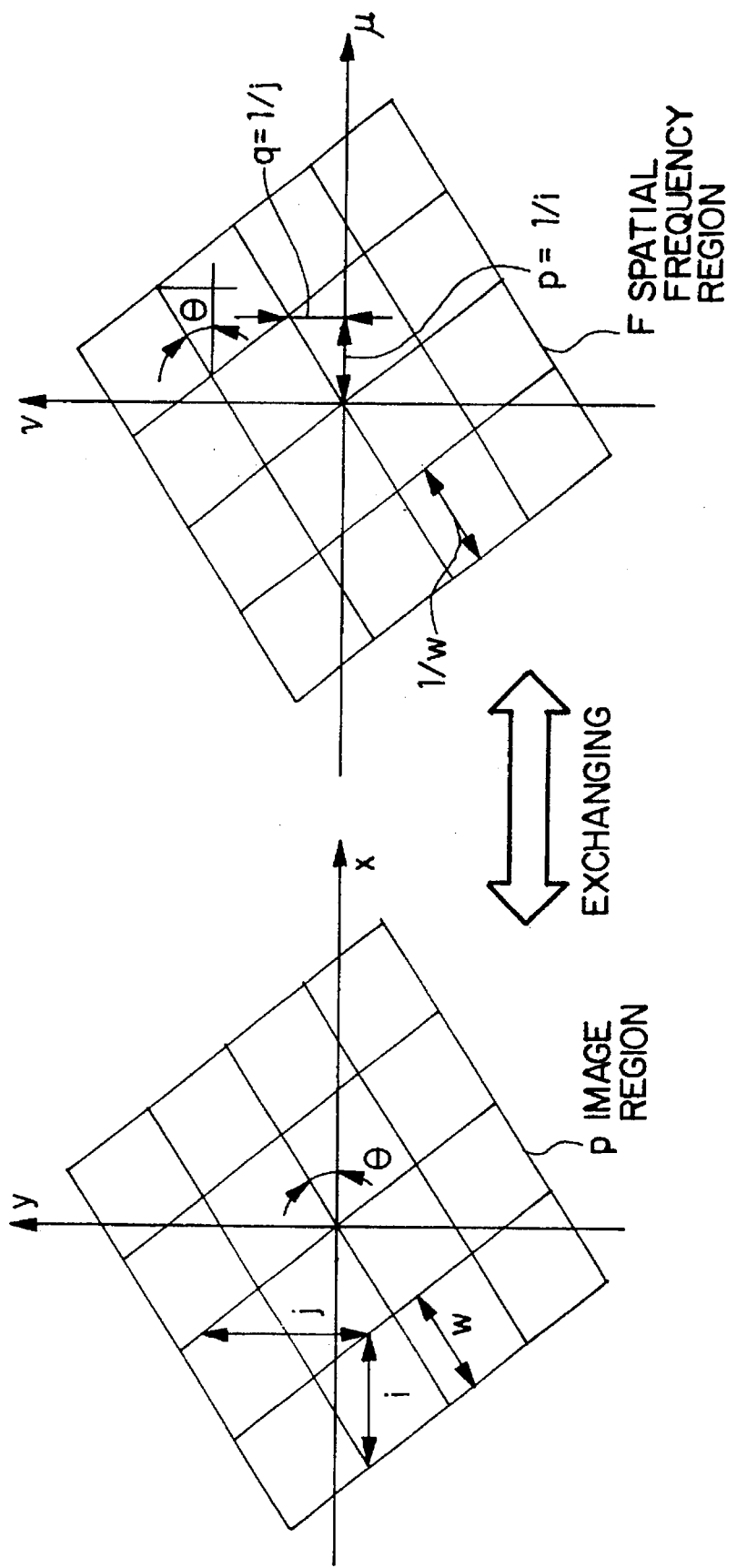
FIG. 6 is a plan view showing a relationship between an image region and a spatial frequency region of a halftone screen.

The halftone screen of approximately 15 degrees is represented in the spatial frequency region F shown in FIG. 6 by formula (7).

$$\begin{aligned}\theta &= \tan(q/p) \\ &= 15 \text{ degrees}\end{aligned} \qquad (7)$$

where p and q are integers of 1 or more.

The optimum one of integer pairs (p, q) satisfying formula (7) is determined depending upon the shape of the rosette pattern occurring about a center of the origin (0, 0) of the spatial frequency region. When three color screens of screen angles ±15 and 45 degrees are superimposed each other, the rosette pattern is discriminated in the following manner.

Figure 7:
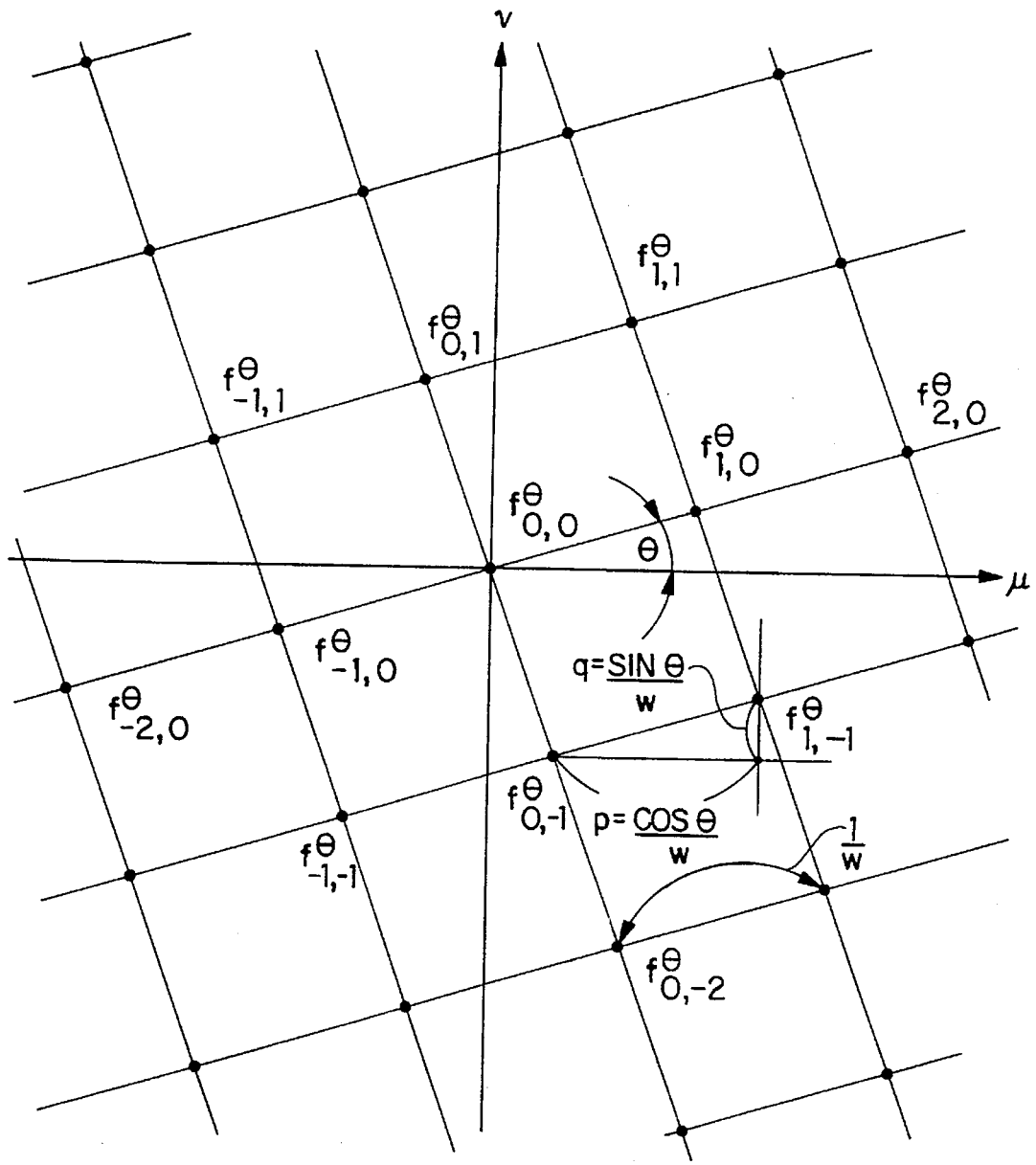
FIG. 7 is a diagram showing a spectrum distribution of a square grating screen when a screen angle θ is 15 degrees.
Figure 8:
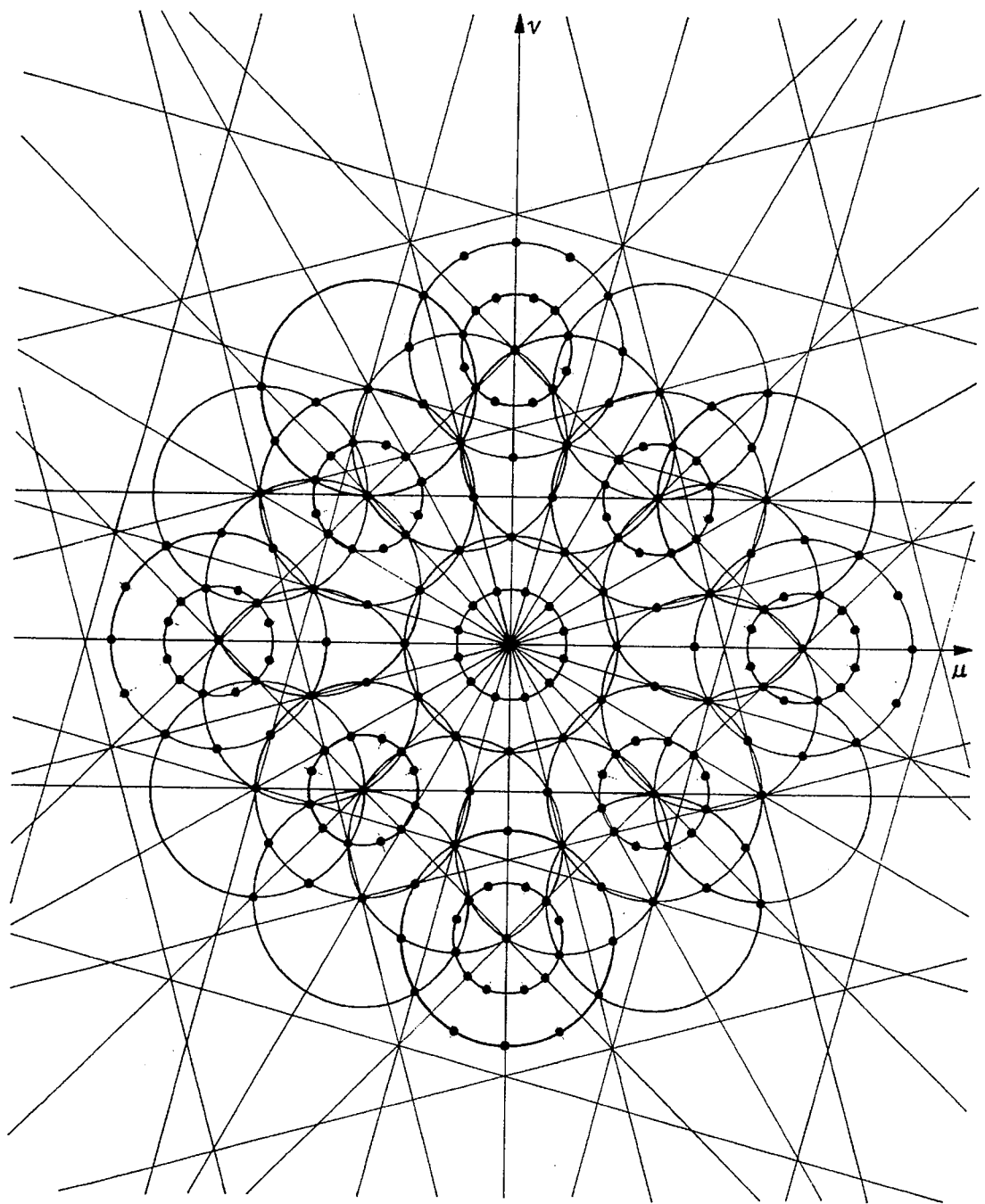
FIG. 8 is a diagram showing the spectrum distribution when three kinds of spectra are superimposed on each other.
Figure 9:
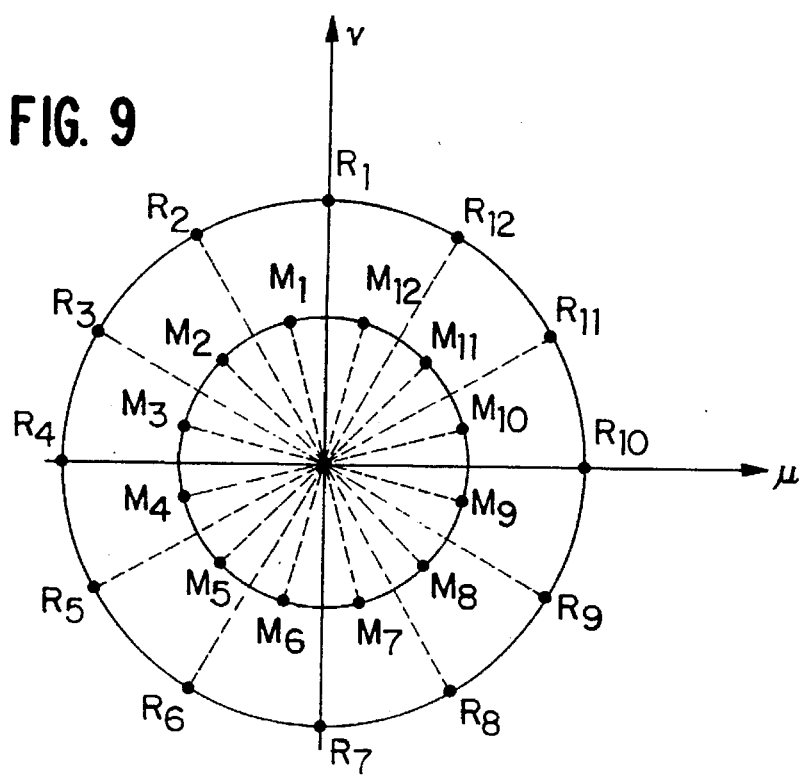
FIG. 9 is a diagram showing a spectrum distribution close to the origin taken from the spectrum distribution shown in FIG. 8.

First, the arrangement of a spectrum f (15) mn having a square grid array with the inclined angle θ of 15 degrees is drawn as shown in FIG. 7. Subsequently, a spectrum f (−15) mn having a square grating array with the inclined angle of −15 degrees, which has a relationship of a mirror image with the spectrum f (15) mn having the inclined angle θ of 15 degrees relative to a frequency axis, is superimposed on the respective spectra of the spectrum f (15) mn. This operation is equivalent to the calculation of the convolutions of the spatial frequency spectrum f (15) mn and f (−15) mn. A symmetrical axis having the inclination of 45 degrees exists in the spectrum appearing due to the convolutions, and several spectra appear in the symmetrical axis. Among the spectra appearing in the symmetrical axis, spectra having a distance from the origin, which is close to a distance between the adjacent spectra, are selected, and among the spectra thus selected, spectra having an orthogonal screen of a square grid array and the inclined angle of 45 degrees are selected. Calculating second convolutions of the spectra thus selected and spectra calculated by the convolutions of the spatial frequency spectra f (15) mn and f(−15) mn, a spectrum having a spatial frequency region shown in FIG. 8 is obtained. The spectrum extracted from the vicinity of the origin shown in FIG. 8 is, as shown in FIG. 9, a rosette pattern of double circular rings where additional spectra $M_1$, $M_2$, ..., $M_{12}$ exist inside of spectra $R_1$, $R_2$, ..., $R_{12}$. The coordinates of these spectra becomes values shown in Table 1 when the inverse number 1/w of a pitch w (dot interval) of the orthogonal screen having the inclined angle of ±θ which satisfies the above-mentioned formula (4) is 1.

TABLE 1

SPECTRUM OCCURRING IN THE VICINITY
OF ORIGIN WHEN THREE TYPES OF SCREENS
ARE SUPERIMPOSED ON EACH OTHER

| | |
|---|---|
| R1 = (0, 2sinθ) | M1 = (cosθ − 4sinθ, sinθ) |
| R2 = (−sinθ, cosθ − 2sinθ) | M2 = (−cosθ + 3sinθ, cosθ − 3sinθ) |
| R3 = (−cosθ + 2sinθ, sinθ) | M3 = (−sinθ, −cosθ + 4sinθ) |
| R4 = (−2sinθ, 0) | M4 = (−sinθ, cosθ − 4sinθ) |
| R5 = (−cosθ + 2sinθ, −sinθ) | M5 = (−cosθ + 3sinθ, −cosθ + 3 sinθ) |
| R6 = (−sinθ, −cosθ + 2sinθ) | M6 = (cosθ − 4sinθ, −sinθ) |
| R7 = (0, −2sinθ) | M7 = (−cosθ + 4sinθ, −sinθ) |
| R8 = (sinθ, −cosθ + 2sinθ) | M8 = (cosθ − 3sinθ, −cosθ + 3sinθ) |
| R9 = (cosθ − 2sinθ, −sinθ) | M9 = (sinθ, cosθ − 4sinθ) |
| R10 = (2sinθ, 0) | M10 = (sinθ, −cosθ + 4sinθ) |
| R11 = (cosθ − 2sinθ, sinθ) | M11 = (cosθ − 3sinθ, cosθ + 3sinθ) |
| R12 = (sinθ, cosθ − 2sinθ) | M12 = (−cosθ + 4sinθ, sinθ) |

Therefore, in order not to generate coarse moire when the orthogonal screens having the screen angles θ of ±15 degrees and 45 degrees, respectively, are superimposed on each other, it is necessary to generate the rosette pattern having the double circular rings as shown in FIG. 9.

Figure 10:
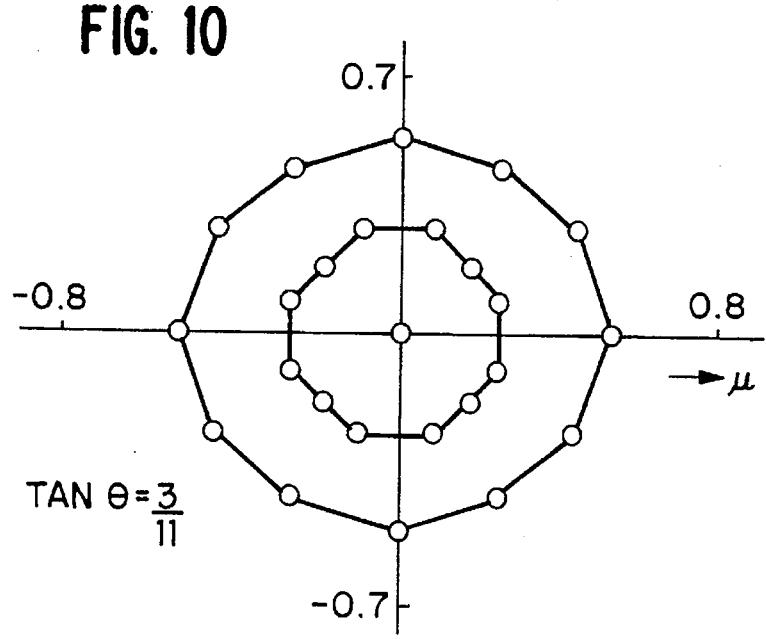
FIG. 10 is a diagram showing a spectrum distribution at the time of tan θ=3/11, likewise as in FIG. 9.
Figure 11:
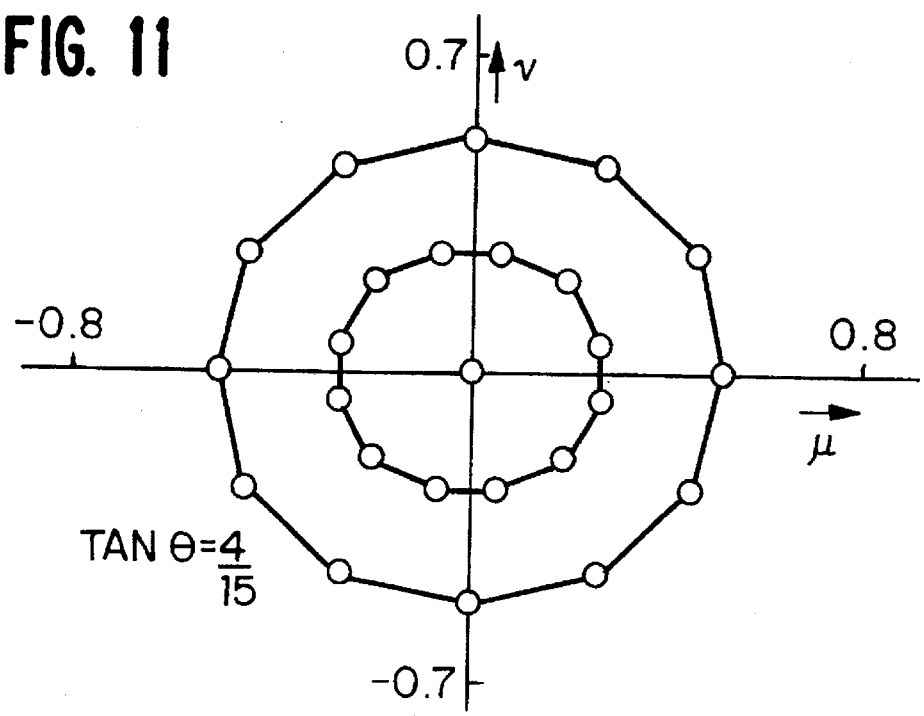
FIG. 11 is a diagram showing a spectrum distribution at the time of tan θ=4/15, likewise as in FIG. 9.
Figure 12:
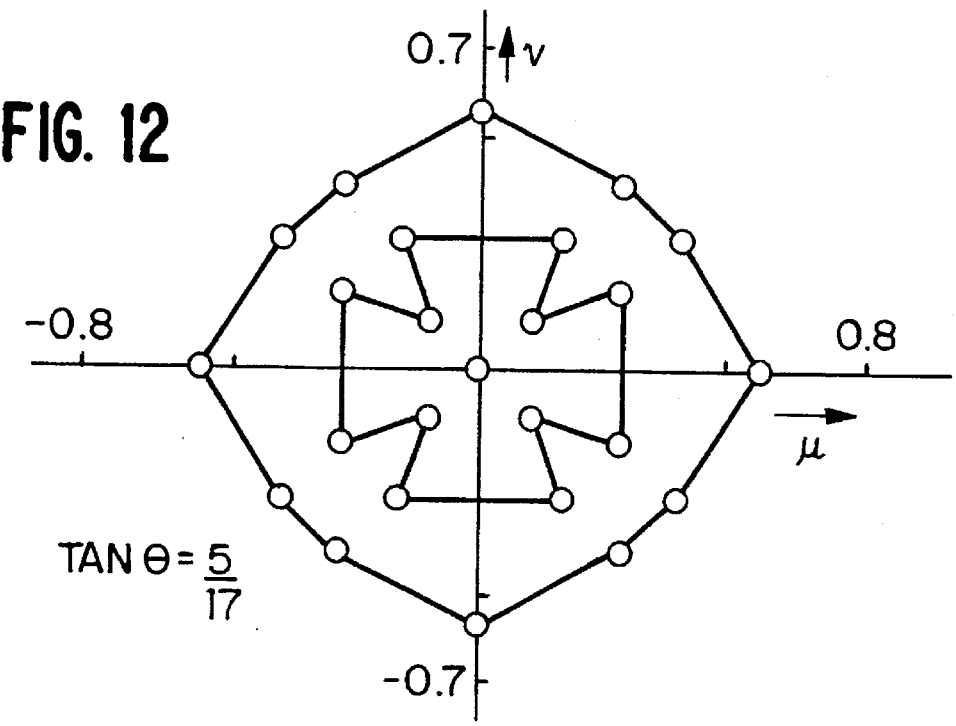
FIG. 12 is a diagram showing a spectrum distribution at the time of tan θ=5/17, likewise as in FIG. 9.

When the values of $R_1$, $R_2$, ..., $R_{12}$ and $M_1$, $M_2$, ..., $M_{12}$ are calculated relative to various rational tangents and plotted on the coordinates of μ and ν, the values of tan θ (=q/p) at which the rosette pattern of the fine double circular rings appears are limited to 3/11, 4/15, and 5/19. For example, in the case of tan θ=3/11 and 4/15, the double circular rings as shown in FIGS. 10 and 11 are obtained. However, in the case of tan θ=5/17, no double circular rings are obtained as shown in FIG. 12. In the case of tan θ=5/17, coarse moire generates.

Consequently, from formula (7), pairs (p, q) of q and p where no coarse moire occurs are (11, 3), (15, 4) and (19, 5).

Figure 13:
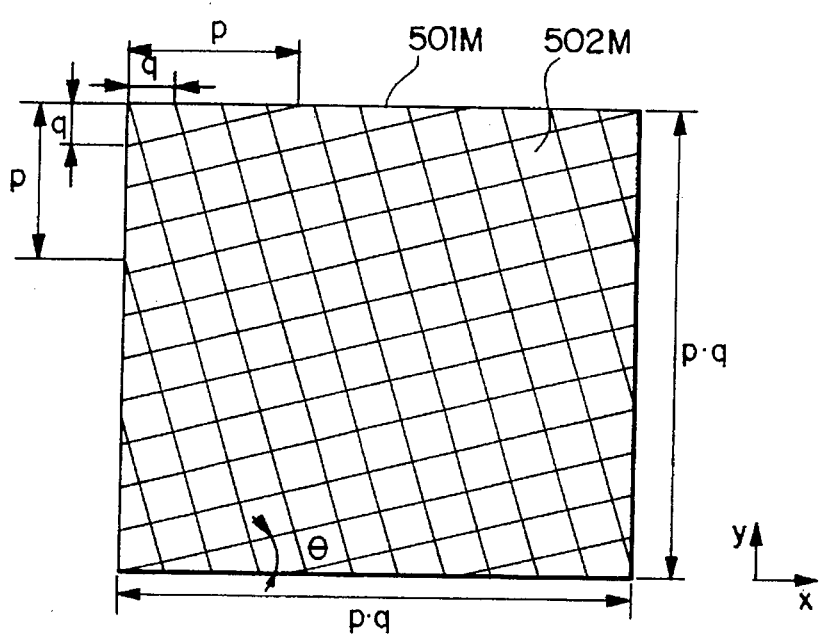
FIG. 13 is a plan view showing a screen of the M multi-cell.

FIG. 13 is a plan view showing a magenta halftone screen at the time of p=11 and q=3. In the figure, the orthogonal screen is an M multi-cell 501M having the screen angle θ of $\tan^{-1}(3/11)$ degrees. The M multi-cell 501M is constituted by a plurality of square shaped sub-cells 502M which are cyclically arranged in a direction inclined by the $\tan^{-1}(3/11)$ degrees.

The sub-cell 502M is a dot cell for forming one dot. The M multi-cell 501M is a fundamental cycle pattern of the halftone screen, each side of which has a length of p·q which is a least common multiple of p and q. The reason that the length of one side is set to p·q is because of the periodicity of the orthogonal screen. That is, when the spectrum at a position of the coordinates (p, q) of the spatial frequency region F shown in FIG. 6 is transferred to the image region, an orthogonal screen having a cycle of 1/p in the x-direction and 1/q in the y-direction is obtained, and the periodic ratio of the orthogonal screen in the x- and y- directions is p:q. Therefore, in order that the multi-cell 501M constitutes a periodic screen, one side of the screen must be the least common multiple of the ratio. The multi-cell 501M possesses the following properties.

a) The inclined angle θ of the sub-cell 502M and the screen line is represented by formula (7).

b) An area S of the sub-cell 502M is a square of the dot interval w and represented by the following formula (8) from formula (4).

$$S=(p\cdot q)^2/(p^2+q^2) \qquad (8)$$

c) The M multi-cell 501M has the N sub-cells 502M, N being represented by Expression (9).

$$N=p^2+q^2 \qquad (9)$$

N is a value given by dividing the area of the M multi-cell 501M by an area S of the sub-cell 502M. Since p and q are integers, the number N of the sub-cells 502M is always an integer.

d) The sub-cell 502M is the minimum cyclical pattern of the multi-cell.

From the above-mentioned properties, the M multi-cell 501M is a halftone screen constituted by N sub-cells 502M, that is, N dots, having the number of gradations of (S+1) and the screen angle of θ.

For example, in the case of p=11 and q=3, the size of the M multi-cell 501M is 33×33 pixels, and the number of sub-cells 502M, that is, the number of dots is 130 (=$11^2+3^2$). The number (=S+1) of gradations which can be expressed by the M multi-cell 501M is 9.3769 gradations, and the screen angle θ is 15.255 degrees. However, since the gradation number of 9 is low, the scaling factor β is set, and one side of the M multi-cell 501M is multiplied by β. As a result, the area of the sub-cells 502M becomes $β^2$ times as large as the original one, and the number of gradations becomes nearly $β^2$ times as large as the original one. That is, the area S is represented by formula (10).

$$S=(p\cdot q\cdot β)^2/(p^2+q^2) \qquad (10)$$

When the scaling factor β is used, the number of gradations is changed, however, the number N of the sub-cells 502M is not changed.

Figure 14:
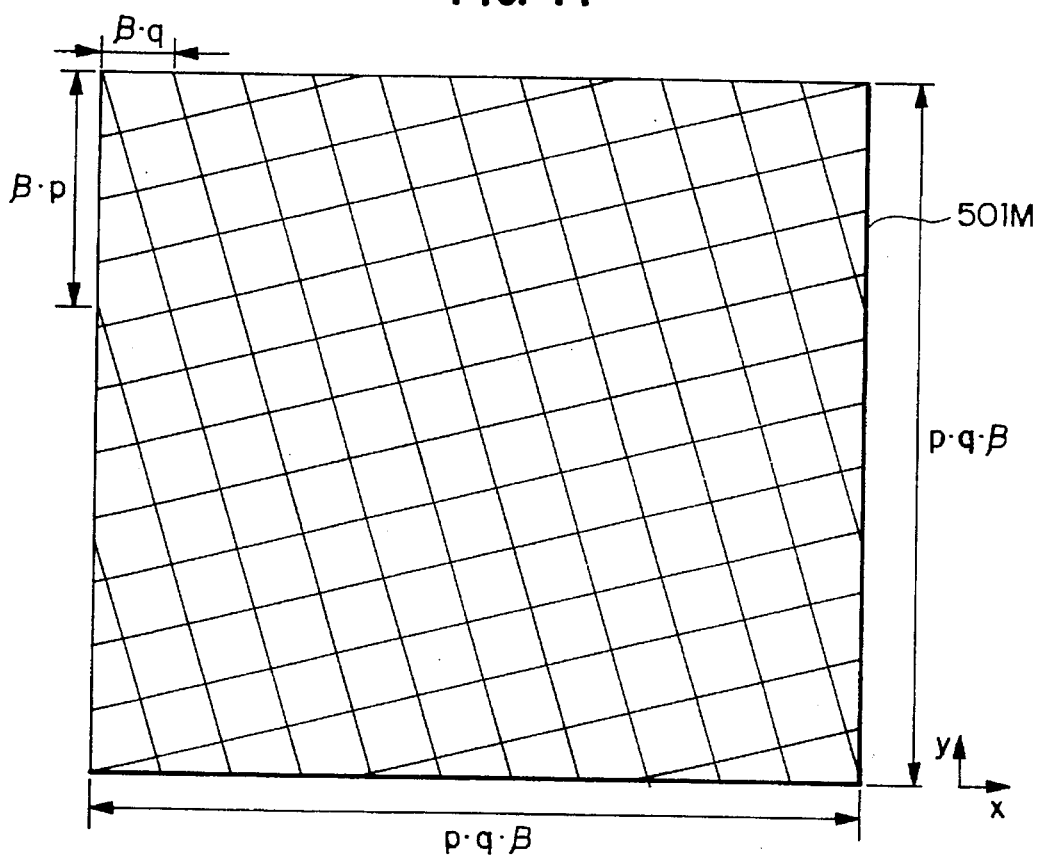
FIG. 14 is a plan view showing a screen resulting from magnifying the screen of the M multi-cell to the size of scaling factor β times.

The frame of the magenta halftone screen is as described above, and the frame of the cyan halftone screen is obtained by mirror-reversing the M multi-cell 501M shown in FIG. 13 or 14 with respect to the x-axis or the y-axis.

FIG. 13 or 14 shows only the frame of the M multi-cell 501M, but in fact, the sub-threshold value matrix shown in FIG. 3 is set for each of the sub-cells 502M. The threshold value of the sub-threshold value matrix is gradually increased from the center of the matrix outward. However, the shape of the boundary of each sub-cell 502M shown in FIG. 3 is not always identical.

Figure 15:
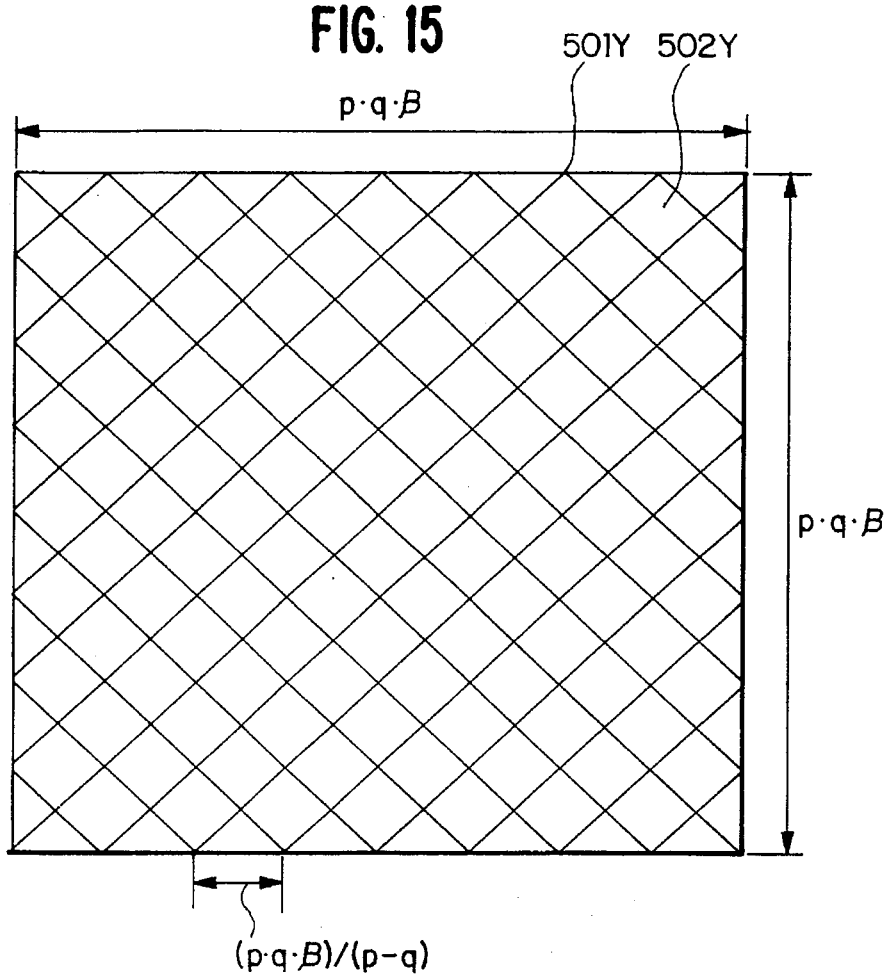
FIG. 15 is a plan view showing a screen of the Y multi-cell.

FIG. 15 is a plan view showing the yellow halftone screen when p=11 and q=3. In FIG. 15, the orthogonal screen is a Y multi-cell 501Y having the screen angle θ of 45 degrees. The Y multi-cell 501Y is constituted by a plurality of sub-cells 502Y which are square and cyclically arranged in a direction inclined by the angle of 45 degrees.

The sub-cell 502Y is a dot cell which forms one dot. The Y multi-cell 501Y is a fundamental cycle pattern of the halftone screen. In order to make the size of the yellow halftone screen identical with that of the magenta and cyan halftone screens, a length of one side of the Y multi-cell 501Y is p·q which is the least common multiple of p and q. On the other hand, since the minimum cycle r of the orthogonal screen of 45 degrees is an inverse number when m=n=1 in formula (6), it is represented by formula (11):

$$r=1/((1/w)(\cos\theta-\sin\theta)) \tag{11}$$

where $$p=(1/w)\cos\theta$$

$$q=(1/w)\sin\theta \tag{12}$$

Therefore, formula (11) is represented by formula (13):

$$r=1/(p-q) \tag{13}$$

When the minimum cycle r is increased by p·q times and further multiplied by the scaling factor β, a cycle in both of the x- and y- directions in the image region P is obtained. Thus, the cycle r is given by formula (14).

$$r=(p\cdot q\cdot\beta)/(p-q) \tag{14}$$

The area of the sub-cell 502Y is given by the following formula (15):

$$S45=(p\cdot q\cdot\beta)^2/(2(p-q)^2) \tag{15}$$

The number of the sub-cells 502Y within the Y multi-cell 501Y is $2(p-q)^2$.

FIG. 15 shows only the frame of the multi-cell 501Y of the yellow halftone screen, however, in fact, the matrix shown in FIG. 5 is set for each of the sub-cells. In FIG. 5, the threshold value of the sub-cell is gradually increased from the center of the matrix outward.

As described above, p and q are determined to any value of (11, 3), (15, 4) and (19, 5) to reduce moire. Also, to reduce moire, the M-screen memory 6M and the C-screen memory 6C store the first and second threshold values assigned to the respective pixels of the M multi-cell 501M and C multi-cell 501C each having the square matrix with the screen angles of $\pm\tan^{-1}(q/p)$ and one side of β·p·q. The M multi-cell 501M and the C multi-cell 501C respectively consist of N ($=p^2+q^2$) sub-cells which have the threshold values in accordance with the predetermined number of gradations and are continuously arranged in the direction of the screen angles of $\pm\tan^{-1}(q/p)$. Also, the sub-cells 502M and 502C store a plurality of threshold values having the number of gradations which satisfy formula (10).

On the other hand, the Y screen memory 6Y outputs the fourth threshold value assigned to the Y multi-cell 501Y having a square matrix with a screen angle of 45 degrees and each side of β·p·q, and the Y multi-cell 501Y consists of $2(p-q)^2$ sub-cells 502Y which have threshold values in accordance with the predetermined number of gradations and are arranged continuously in the direction of the screen angle of 45 degrees. The sub-cell 502Y stores a plurality of threshold values having the number of gradations which satisfy formula (15).

The first to third threshold values are repeatedly outputted in a cycle of the number of pixels of β·p·q in synchronism with the multivalued image data of each color in accordance with control of the control circuit 4.

Figure 1:
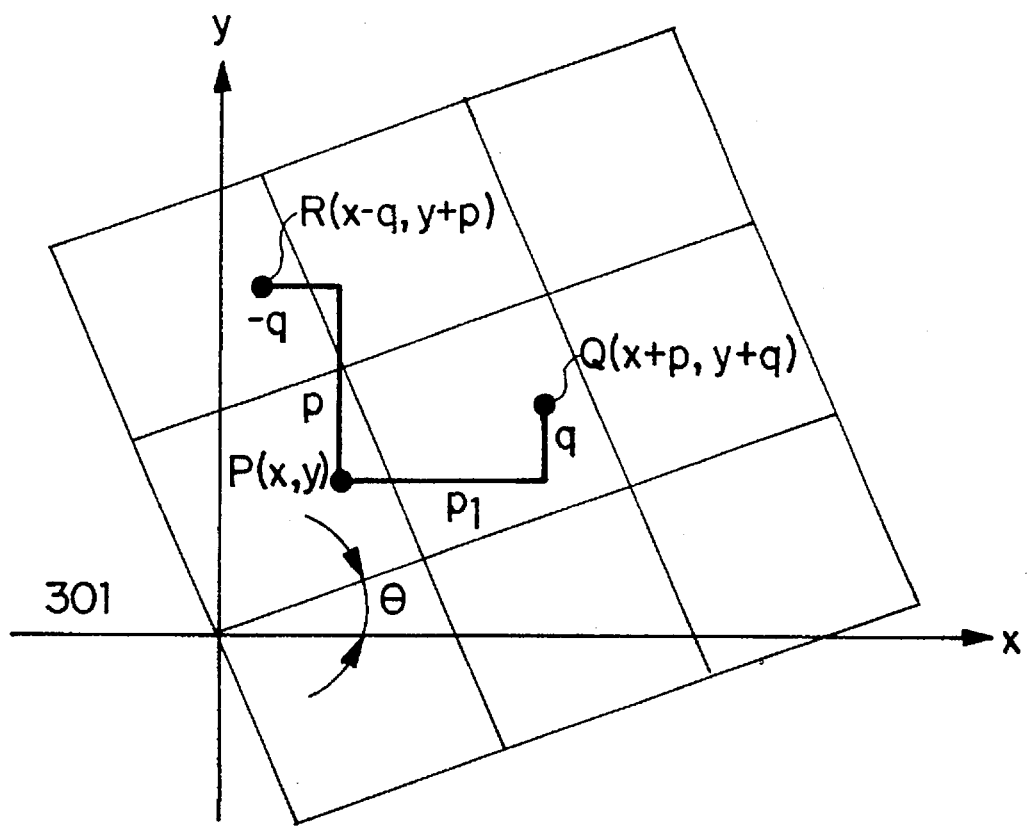
FIG. 1 is a plan view showing a structure of a digital halftone screen.
Figure 16:
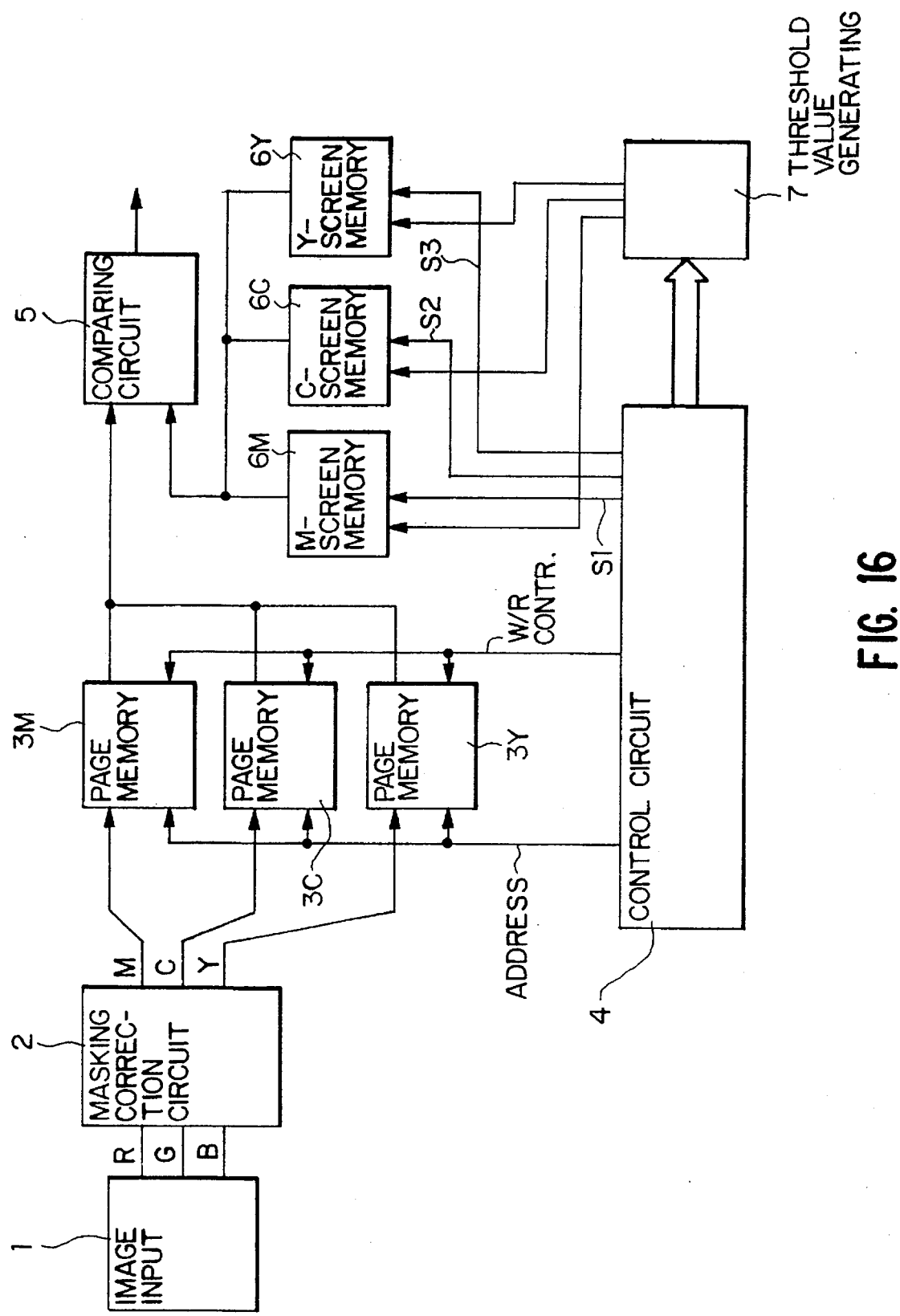
FIG. 16 is a block diagram showing a color image processing apparatus in accordance with a second embodiment of the present invention.

FIG. 16 is a block diagram showing a color image processing apparatus in accordance with a second embodiment of present invention. In the figure, the color image processing circuit of the second embodiment adds a threshold value generating circuit 7 to the color image processing apparatus of the embodiment shown in FIG. 1, so that a threshold value can be automatically generated and stored in each of the screen memories.

A procedure of generating the threshold value in the threshold value generating circuit 7 is as follows:

1) Reference Threshold Value Function

For the purpose of preparing the threshold value, in this embodiment, coordinate data of coordinates (x, y) of a reference threshold value function is used. The coordinates (x, y) also serve as coordinates of pixels within a region of the reference threshold value function.

Figure 17:
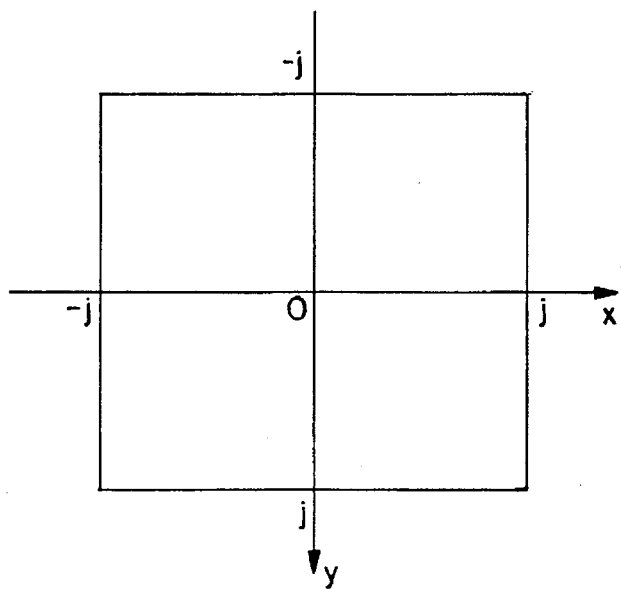
FIG. 17 is a diagram showing a region of a reference threshold value function.

The reference threshold value function means a function for calculating a threshold value t of arbitrary coordinates (x, y) in a square region of $-j\leq x\leq j$, $-j\leq y\leq j$, as shown in FIG. 17.

The reference threshold value is represented by formula (16).

$$t=k\cdot(|x|+|y|)/2 \tag{16}$$

When j is 1, then an effective region of the reference threshold value function is $-1\leq x\leq 1$ and $-1\leq y\leq 1$. The threshold value t is an integer value resulting from multiplying the mean of the respective absolute values of x and y by k and then omitting the decimal fractions of the mean thus multiplied, which is the threshold value t of the coordinates (x, y). In formula (16), k must be a value larger than the number of gradations required.

In the following description, it is presumed that a reference threshold value region 801 in FIG. 19 is a square region defined by ranges of $-1\leq x\leq 1$ and $-1\leq y\leq 1$.

2. Determination of Size of Multi-cell

Areas of the multi-cells 501M to 501Y are calculated in accordance with three constant data strings (p, q, β) supplied from the control circuit 4. Each of the multi-cells is a square having an area of p·q·β×p·q·β.

3. Addition of Surplus Region

As shown in FIG. 18, a matrix region 903 where a surplus region 902 is added to a square region 901 having the shape of a multi-cell is ensured. A Purpose of adding the surplus region 902 thereto is to supplement an insufficient region of the sub-cell having an incomplete shape (not square) contained in the square region 901 constituting the shape of the multi-cell with the surplus region 902 to make the square region of the sub-cell complete. Therefore, the area α of the surplus region 902 must be larger than the cycle in the x-direction of the sub-cell or the cycle in the y-direction thereof. In concrete, the width c of the surplus region 902 of the screen of the multi-cells 501M and 501C having the screen angles of ±15 degrees satisfies either formula (17) or (18).

$$\alpha\geq\beta\cdot p \tag{17}$$

$$\alpha\geq\beta\cdot q \tag{18}$$

4. Arrangement of Threshold Value

It is assumed that, as shown in FIG. 19, the reference threshold value region 801 expressed by the reference threshold value function is a virtual plane 1001 arrayed continuously in the form of tiles in the x- and y- directions. Since the reference threshold value function is defined by a range of $-1 \leq x \leq 1$, $-1 \leq y \leq 1$, the virtual plane 1001 is constituted by an assembly of the square grids having vertical and horizontal cycles of 2, and its one block corresponds to one sub-cell. Hereinafter, the reference threshold value region of the block within the range of $-1 \leq x \leq 1$, $-1 \leq y \leq 1$ is called an origin threshold value region 1005 in distinction from the reference threshold value region of other blocks.

The principle of the arrangement of the threshold value is that each block of the virtual plane 1001 is enlarged so as to be identical with the area S of the sub-cells 502M and 502C obtained by formula (10), and further the whole virtual plane 1001 rotated by the rotational angle obtained by formula (7) is stuck on the matrix region 903 to which the surplus region 902 is added.

An example of actual processing will be described with reference to FIG. 19.

The coordinate data X and Y of coordinates (X, Y) 1002 of the pixel in the region 903 to which the surplus region 902 is added is substituted for the Affine transforming formula (19), and then transformed into coordinates x, y of coordinates (x, y) 1003 on the virtual plane 1001 where the reference threshold value regions 801 are arrayed continuously in the x- and y- directions.

$$x = a \cdot X - b \cdot Y + c$$

$$y = b \cdot X + a \cdot Y + d \tag{19}$$

$$a = \cos\theta / M$$

$$b = \sin\theta / M$$

$$c = (M \cdot x_s - X_0 \cdot \cos\theta + Y_0 \cdot \sin\theta)/M$$

$$d = (M \cdot y_s - X_0 \cdot \sin\theta - Y_0 \cdot \cos\theta)/M$$

In formula (19), a coordinate $(x_s, y_s)$ is a center of rotation on the virtual plane 1001, which equals to a coordinate $(-1, -1)$ on the left-sided upper portion of the origin threshold value region 1005. Coordinate $(X_0, Y_0)$ is a center of rotation in the square region 901 corresponding to coordinate $(x_s, y_s)$, which equals to a coordinate $(\alpha, \alpha)$. The rotational angle $\theta$ of the reference threshold value region is given by formula (7). The enlargement ratio M of the reference threshold value region is given by formula (20).

$$M = (p \cdot q \cdot \beta)/(2(p^2 + q^2)^{1/2}) \tag{20}$$

Description of Expression (20) is supplemented. The length of each side of the sub-cells 502M and 502C in the multi-cell is a square root of the area obtained by formula (10). On the other hand, the length of each side of the reference threshold value region to be enlarged is 2. Therefore, the enlargement ratio M is obtained by dividing the length of one side of the sub-cell to be obtained by the length 2 of one side of the reference threshold value region.

Subsequently, using the coordinate data x and y of the coordinates (x, y) 1003 on the virtual plane 1001, which is calculated by formula (19), the following operation is executed to produce coordinate data x' and y' of the coordinate value (x', y') 1004 on the reference threshold value region 801. The values (an initial value=0) of an X-counter and a Y-counter are produced together with this operation, and they are stored to be used in the succeeding procedure.

(Operation of obtaining x' from x)

(A) The following calculation is performed. The value of the coordinate data x after the completion of the following calculation, becomes the coordinate data x' (x'=x).

"When x<−1, then 2 is added to x until x≧−1."

A count of a X-counter is decreased by the number of times of adding operation.

"When x>+1, then 2 is subtracted from x until x≦1."

The count of the X-counter is increased by the number of times of subtracting operation.

(Operation of obtaining y' from y)

(B) The following calculation is performed. The value of the coordinate data y after the completion of the following, comes to the coordinate data y' (y'=y).

"When y<−1, then 2 is added to y until y≧−1."

A count of a Y-counter is decreased by the number of times of adding operation.

"When y>+1, then 2 is subtracted from y until y≦1."

The count of the Y-counter is increased by the number of times of subtracting operation.

A purpose of the operations (A) and (B) is that, when the coordinates (x, y) 1003 on the virtual plane 1001 do not exist within a range of $-1 \leq x \leq 1$ and $-1 \leq y \leq 1$, the length of one side of the reference threshold value region, that is, 2 is added to or subtracted from the x-coordinates or y-coordinates, thereby to obtain coordinates within a range of $-1 \leq x \leq 1$ and $-1 \leq y \leq 1$. The values of the X and Y-counters indicate how many blocks the origin threshold value region 1005 must be shifted in each of the x- and y- directions in order to move the region 1005 to a position of one block on the virtual plane 1001 including the coordinates (x, y) 1003.

Through the operations (A) and (B), the coordinates x' and y' in the reference threshold value function region 801 and the count values of X- and Y- counters are calculated.

Figure 21:
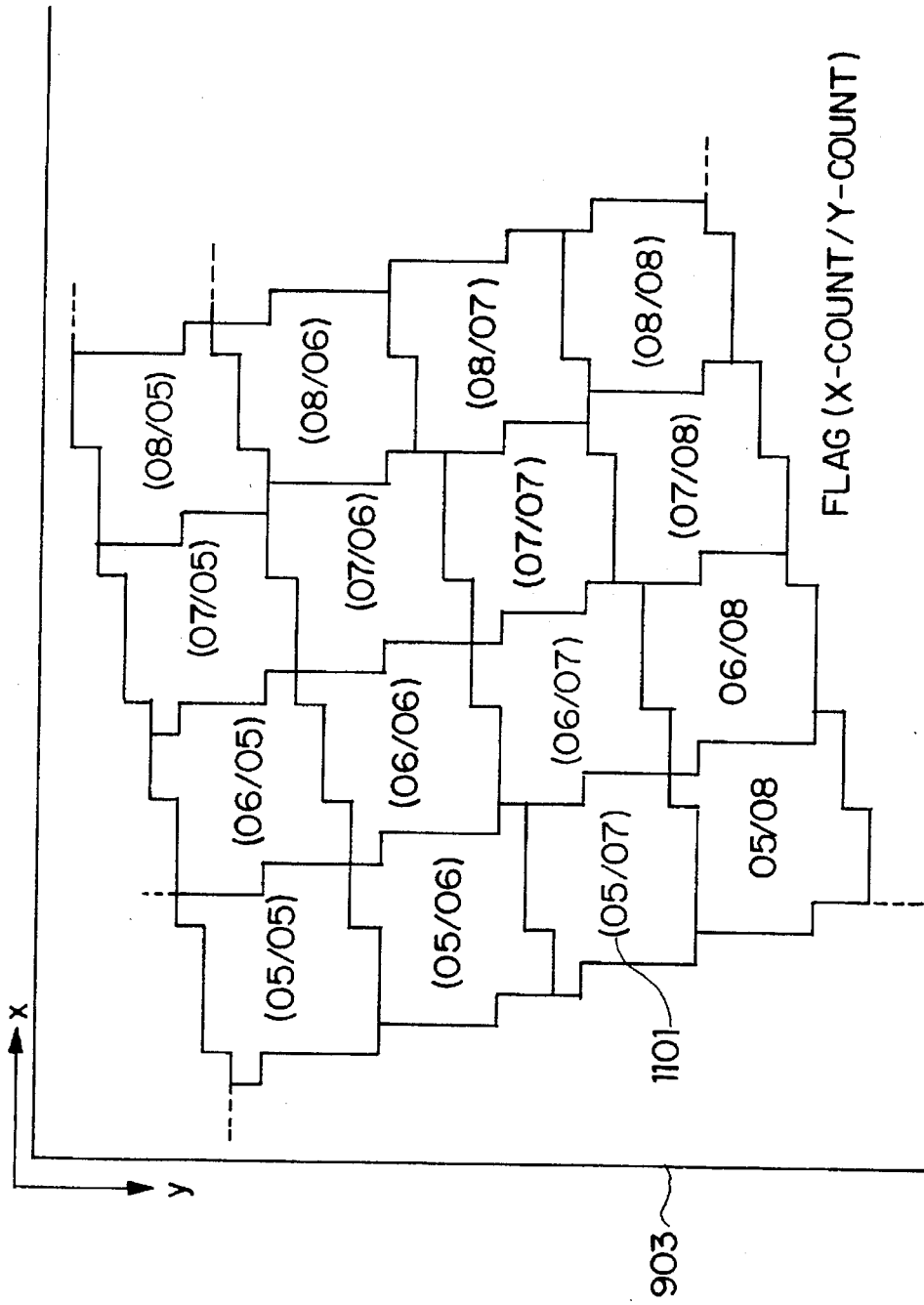
FIG. 21 is a block diagram showing a part of a multi-cell having sub-cells to which the flags shown in FIG. 20 are added.

The values of the X-counter and the Y-counter are arranged as shown in FIG. 20, to form flag values 1101 discriminating the positions of a plurality of sub-cells 502M (502C). As shown in FIG. 21, different flag values are added to the respective sub-cells. The flag value and the coordinates x', y' are stored as pair data.

Figure 22:
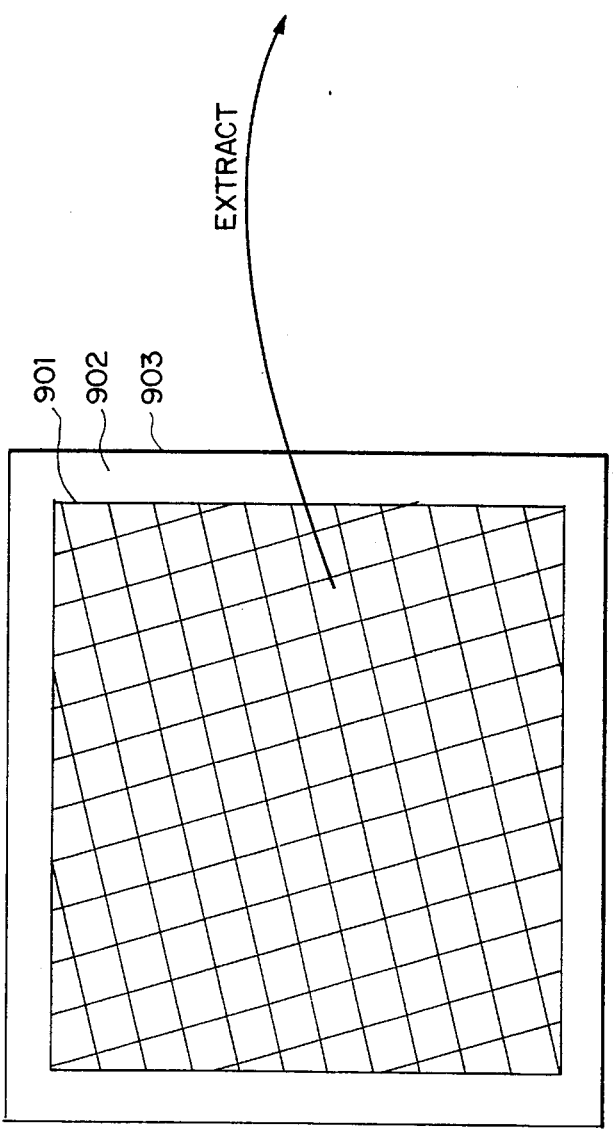
FIG. 22 is a block diagram showing a state before a threshold value of the sub-cell extracted from the multi-cell is optimized.

On the other hand, the coordinate data x' and y' calculated by the operations (A) and (B) is substituted for the reference pattern function formula (16), thereby to obtain data of the threshold value t at the coordinates (X, Y) in the region 903 to which the surplus region is added. The matrix on the right-side of FIG. 22 is obtained by calculating the threshold values t for the coordinates (X, Y) of all pixels of a sub-cell in the region 903. The threshold value t is stored together with the flag value 1101 in a memory or the like.

5. Optimization of Threshold Value

As shown in FIG. 22, the same threshold values t for each sub-cell calculated by the above-mentioned manner exist within the matrix of the same sub-cell, and the threshold values are far from arithmetic sequence. When the threshold values as shown in FIG. 22 are used for a halftone dot meshing process, smooth gradation can be expressed. Therefore, the threshold values must be corrected to approximate arithmetic sequence values thereby to optimize the threshold values. An example of optimizing the threshold value will be indicated by the following procedure. The optimization of the threshold value in the magenta halftone screen shown in FIG. 22 will be firstly described as one example.

(a) Extraction of one sub-cell:

Regions, where the flag value 1101 (FIG. 20) of the coordinate data x', y' is identical, mean a region of one sub-cell. By referring to the flag value, the region of one sub-cell is extracted from the memory.

(b) Calculation of an area of the sub-cell 502M:

The number of pixels of the sub-cell extracted is counted, and its result is regarded as an area of the sub-cell 502M extracted.

(c) Calculation of an incremental value of a threshold value:

According to the number of gradations of an image to be subjected to halftone dot meshing process and the area of the sub-cell 502M, an initial value of the threshold value and the incremental value are operated. For example, if the image to be subjected to halftone dot meshing process consists of pixels of 256 gradations and the area of the sub-cell 502M (the number of pixels) is 35, the approximate arithmeic sequence of 7, 14, 21, 35, 43, 50, 57, 64, 71, 78, 85, 92, 99, 106, 113, 120, 128, 135, 142, 149, 156, 163, 170, 177, 184, 191, 198, 205, 213, 220, 227, 234, 241 and 248 are provided for the threshold values in the sub-cell, thereby being capable of expressing smooth halftones. A minimum value minT and an incremental value deltT of the threshold value are calculated in accordance with formula (21) whereas a maximum value maxT of the threshold value is calculated in accordance with formula (22) respectively.

$$minT = deltT = L/(S+1) \tag{21}$$

$$maxT = S \cdot deltT \tag{22}$$

where L is the number of gradations of the image to be subjected to halftone dot meshing process, and S is the area of the sub-cell 502M.

(d) Extraction of numerical values used as a threshold value of the sub-cell 502M:

Numerical values of 90, 84, 78, 72, 69, 63, 60, 57, 51, 48, 45, 49, 39, 36, 30, 24, 18 and 3 in Drawing 22 are extracted. Hereinafter, these numerical values are called "label".

(e) Transformation of the threshold value:

The threshold values are transformed in order from the label of a maximum value. Since there are two pixels 1301 having 90 being the maximum label, the label of 90 is transformed into two threshold values of maxT and maxT−deltT having the maximum threshold value. At this time, the order of transformations is based on a proper rule. For example, a rule is applied which transforms the threshold values clockwise in farther order from the center of the sub-cell 502M. When transformation of the label 90 into the threshold value is finished, the label 84 are then transformed into the threshold value, likewise. Subsequently, transformation of the labels into the threshold values is executed in the order of 78, 72 . . . , and when the transformation of the last label of 3 has been finished, the sub-cell 502M having a continuous threshold values at gradations of minT to maxT is completed.

In this embodiment, the values obtained by formulas (21) and (22) are applied as the minimum value minT of the threshold value, the incremental value deltT and the maximum value maxT of the threshold value, however, the invention is not limited to or by this manner. In brief, it is important to enable a smooth halftone to be expressed. The threshold value may be optimized by means for fitting those values to the characteristics of an equipment, for example, such that the incremental value is determined in accordance with the ink leakage characteristics when printing.

After all the sub-cells 502M are subjected to the threshold value optimizing process, the surplus region 902 is cut, thereby to obtain the threshold value matrix of the multi-cell 501M having desired screen angle and the number of gradations. The threshold value of the sub-cell 502C is also optimized likewise as the sub-cell 502M.

The procedure of generating the threshold value of the sub-cell 502Y is fundamentally the same as that of the sub-cell 502M. The difference therebetween resides in using the following formula (23) under the condition of p>q for calculation of the width α of the surplus region; fixing the rotational angle θ of the reference threshold value region to 45 degrees; and using formula (24) for calculation of the enlargement ratio M of the reference threshold value region.

$$\alpha \geq (p \cdot q \cdot \beta)/(p-q) \tag{23}$$

$$M = (p \cdot q \cdot \beta)/(2 \cdot 2^{1/2}(p-q)) \tag{24}$$

Figure 23:
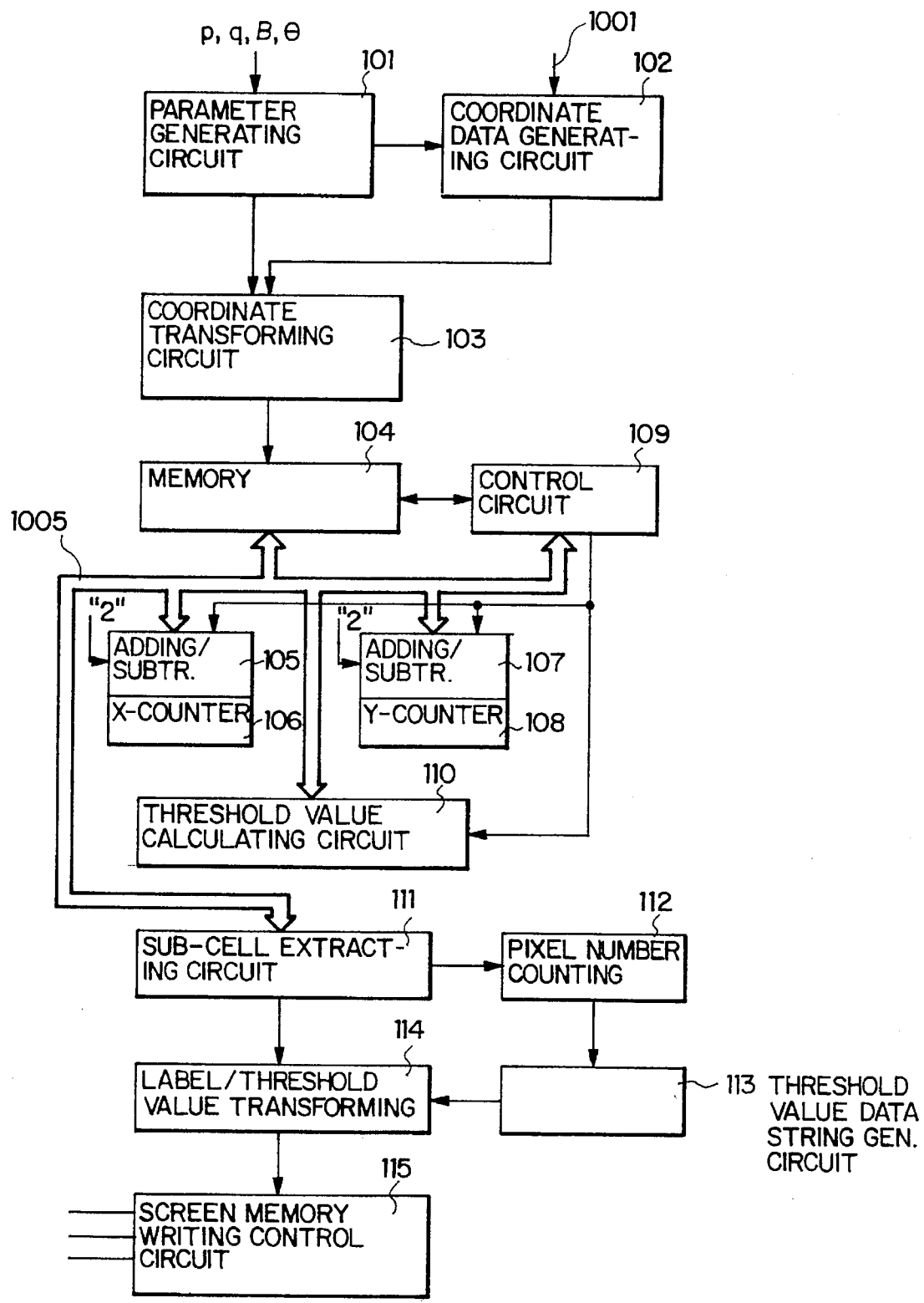
FIG. 23 is a block diagram showing a threshold value generating circuit in detail.

FIG. 23 is a block diagram showing a threshold value generating circuit 7 for use in the color image processing apparatus shown in FIG. 16, in detail.

In the figure, a parameter generating circuit 101 generates areas (p·q·β×p·q·β) of the multi-cells 501Y, 501M, 501C and 501BK, the width α of the square region 903 including the surplus region shown in FIG. 18, and the respective parameters of the enlargement ratio M in accordance with the screen angle θ, rational integers p and q of tan θ and the respective data strings of the scaling factor β supplied from the control circuit 4. The data of the width α of the square region 903 is the result calculated by formulas (17) and (18) when data of the screen angle θ is data representing ±15 degrees, and the result calculated by formula (23) when θ is data representing 45 degrees. The data of the enlargement ratio M is the result calculated by formula (20) when data of θ is data representing ±15 degrees, and the result calculated by formula (24) when θ is data representing 45 degrees.

A coordinate data generating circuit 102 generates the coordinate data X and Y of the coordinates (x, Y) in the square region 903 to which the surplus region is added as shown in FIG. 19. This coordinate data is generated on the basis of the area data and data of the width α outputted from the parameter generating circuit 101, and represents coordinate data of each pixel when the matrix square region 903 is moved onto the x- and y- coordinate axes. The generation of the coordinate data X and Y is controlled in accordance with the control signal 1001 from the control circuit 4.

The coordinate data X, Y, the enlargement ratio M and α data are supplied to a first coordinate transforming circuit 103. The coordinate transforming circuit 103 executes the Affine transformation of formula (19) to transform the coordinate data X and Y into coordinate data x and y of the coordinates (x, y) on the plane 1001 (FIG. 19) of the virtual orthogonal screen. The coordinate data x and y is stored in a memory 104 line by line.

The memory 104, an x-adding/subtracting circuit 105, an x-counter 106, a y-adding/subtracting circuit 107, a y-counter 108 and a control circuit 109 constitute a second coordinate transforming circuit for executing the above-mentioned operations (A) and (B). The addition and subtraction of 2 in the operation (A) are performed by the x-adding/subtracting circuit 105 to which coordinate data x is supplied, and simultaneously, the count of the x-counter 106 is increased or decreased every subtraction and addition. On the other hand, the addition and subtraction of 2 in the operation (B) are performed by the adding/subtracting circuit 105 to which coordinate data y is supplied, and simultaneously the count of the y-counter 106 is increased or decreased every subtraction and addition. The outputs of the adding/subtracting circuit 105 and 107 are coordinate data x' and y' whereas the outputs of the x- and y- counters 106 and 108 are flag values 1101 (FIG. 20), and both are transmitted to a bus 1005, respectively. The respective adding/subtracting operation, control of the memory, and transfer of data through the bus 1005 are performed by control of the control circuit 109.

A threshold value calculating circuit 110 calculates a threshold value t in accordance with formula (16) of the reference threshold value function on the basis of the coordinate data X' and Y' outputted from the adding/subtracting circuits 105 and 107. The parameters x and y of formula (16) are coordinate data x' and y' stored in the memory 104. The threshold value t and the flag values 1101 of the X- and Y- counters corresponding to the threshold value t are stored simultaneously in the memory 104 as one data in accordance with control of the control circuit 109.

A sub-cell extracting circuit 111 extracts a threshold value within a region of the sub-cell shown in FIG. 21 from the threshold values t stored in the memory 104 and then stored in an internal memory. As described above, since the flag 1101 indicates the region of the sub cell, if the threshold value t having the same flag is read from the memory 104, the threshold value within a specified sub-cell is extracted.

A pixel number counting circuit 112 counts the number of the threshold values t of the sub-cell extracted by the sub-cell extracting circuit 111. The counting result represents the number of pixels of the sub-cell. A threshold value data string generating circuit 113 divides the number of gradations supplied from the control circuit 4 by the number of pixels from the pixel number counting circuit 112, thereby to produce the threshold value of the arithmetic sequence.

A label/threshold value transforming circuit 114 inputs the threshold value from the sub-cell extracting circuit 111 as a label and exchanges each label with the threshold value from the threshold value data string generating circuit 113. The threshold value thus exchanged is stored in the screen memories 6M, 6C and 6Y, respectively, under condition of a screen memory writing control circuit 115.

As was described above, the threshold value generating circuit 7 automatically generates the threshold value and writes them in the screen memories in accordance with the screen angle θ, the rational integers p and q of tan θ, the respective data strings of the scaling factor β, and the number of gradations supplied from the control circuit 4 under control of the control circuit 4. Therefore, when it is intended to change the number of gradations or the scaling factor β, the threshold values can be freely changed.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A color image processing apparatus, comprising:

an image data generating circuit for generating multivalued image data for each color in accordance with density of each color of magenta (M), cyan (C) and yellow (Y);

an M-screen threshold value storing circuit for storing a plurality of first threshold values for comparison with said multivalued image data of magenta (M);

a C-screen threshold value storing circuit for storing a plurality of second threshold values for comparison with said multivalued image date of cyan (C);

a Y-screen threshold value storing circuit for storing a plurality of third threshold values for comparison with said multivalued image data of yellow (Y);

a comparing circuit for comparing said multivalued image data outputted from said image data generating circuit with said first to third threshold values outputted from said M-, C- and Y- screen storing circuits to output a comparison result in the form of a binary signal;

a threshold value generating circuit for generating said first second, and third threshold values; and a control circuit for controlling writing and reading of said first to third threshold values into/from said M-, C- and Y- screen threshold value storing circuits;

wherein said M-screen threshold value storing circuit and said C-screen threshold value storing circuit store said first and second threshold values respectively assigned to each pixel of an M multi-cell and a C multi-cell constituted by square matrixes having screen angles of $\pm\tan^{-1}(q/p)$ and each side of $\beta\cdot p\cdot q$ ($\beta$ is an integer), respectively, and p and q are any values of (11,3), (15,4) and (19,5), and said M multi-cell and said C multi-cell respectively consist of N ($=p^2$, $+q^2$) sub-cells arrayed continuously in directions of said screen angles of $\pm\tan^{-1}(q/p)$ and having threshold values in accordance with the predetermined number of gradations, respectively;

wherein said Y screen threshold value storing circuit stores said third threshold value assigned to a Y multi-cell constituted by a square matrix having a screen angle of 45 degrees and each side of $\beta\cdot p\cdot q$, and said Y multi-cell consists of $2(p-q)^2$ sub-cells arrayed continuously in a direction of said screen angle of 45 degrees and having threshold values in accordance with the predetermined number of gradations;

wherein said first to third threshold values are repeatedly outputted in a cycle of $\beta\cdot p\cdot q$ in synchronism with said multivalued image data of each color in accordance with control of said control circuit; and wherein said threshold value generating circuit comprises:

coordinate data generating means for generating coordinate data X and Y of coordinates (X, Y) within a square region where a surplus region is added to image regions of said M multi-cell, said C multi-cell and said Y multi-cell;

first coordinate transformation means for transforming said coordinate data X and Y into coordinate data x and y of coordinates (x, y) on a virtual orthogonal screen plane in accordance with the affine transformation to output said coordinate data x and y;

second coordinate transformation means for transforming said coordinate data x and y into coordinate data x' and y' within a square region of $-j \leq x \leq j$ and $-j \leq x \leq j$ (j is an integer) to generate flags which discriminate the regions of said sub-cells of said M multi-cell, said C multi-cell and said BK multi-cell in association with said coordinate data x' and y';

threshold value output means responsive to said coordinate data x' and y' for outputting a threshold value t on the basis of t=k·(|x'|+|y'|)/2 where k is an integer;

memory means for storing said threshold value t outputted from said threshold value output means in association with said flag;

threshold value replacing means for selecting said threshold value t associated with said flag within said region from said memory means to replace said threshold value t with another threshold value so as to express a smooth halftone; and writing means for allowing said another threshold value replaced by said threshold value replacing means to be stored in each of said M-, C- and Y- screen threshold value storing circuits.

2. A color image processing apparatus as claimed in claim 1, wherein said second coordinate transformation means comprises:

first adding/subtracting means for adding 2j to said coordinate data x outputted from said first coordinate transformation means until x becomes −j or more while x is smaller than −j, and for subtracting 2j from x until x becomes j or less while x is j or more;

first counting means for decreasing count according to adding operation and increasing count according to subtracting operation of said first adding/subtracting means;

second adding/subtracting means for adding 2j to said coordinate data y outputted from said first coordinate transformation means until y becomes −j or more while y is smaller than −j and for subtracting 2j from y until y becomes j or less while y is j or more; and second counting means for decreasing count according to adding operation and increaing count according to subtracting operation of said second adding/subtracting means.

* * * * *